United States Patent
Furudate et al.

(10) Patent No.: US 9,604,198 B2
(45) Date of Patent: Mar. 28, 2017

(54) VISIBLE LIGHT-RESPONSIVE PHOTOCATALYTIC NANOPARTICLE DISPERSION LIQUID, METHOD FOR PRODUCING SAME, AND MEMBER HAVING PHOTOCATALYTIC THIN FILM ON SURFACE

(71) Applicant: SHIN-ETSU CHEMICAL CO., LTD., Tokyo (JP)

(72) Inventors: Manabu Furudate, Kamisu (JP);
Tomohiro Inoue, Kamisu (JP);
Yoshitsugu Eguchi, Kamisu (JP);
Takashi Kobayashi, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/428,751

(22) PCT Filed: Sep. 3, 2013

(86) PCT No.: PCT/JP2013/073635
§ 371 (c)(1),
(2) Date: Mar. 17, 2015

(87) PCT Pub. No.: WO2014/045861
PCT Pub. Date: Mar. 27, 2014

(65) Prior Publication Data
US 2015/0273440 A1    Oct. 1, 2015

(30) Foreign Application Priority Data

Sep. 19, 2012  (JP) ................................ 2012-205422
May 10, 2013  (JP) ................................ 2013-100253

(51) Int. Cl.
| | | |
|---|---|---|
| *B01J 23/72* | (2006.01) | |
| *B01J 21/06* | (2006.01) | |
| *B01J 23/22* | (2006.01) | |
| *B01J 23/28* | (2006.01) | |
| *B01J 23/835* | (2006.01) | |
| *B01J 23/847* | (2006.01) | |
| *B01J 23/887* | (2006.01) | |
| *B01J 37/04* | (2006.01) | |
| *B01J 37/08* | (2006.01) | |
| *B01J 37/34* | (2006.01) | |

(Continued)

(52) U.S. Cl.
CPC .......... *B01J 23/72* (2013.01); *B01D 53/8687* (2013.01); *B01J 21/063* (2013.01); *B01J 23/22* (2013.01); *B01J 23/28* (2013.01); *B01J 23/835* (2013.01); *B01J 23/8472* (2013.01); *B01J 23/8875* (2013.01); *B01J 35/004* (2013.01); *B01J 35/0006* (2013.01); *B01J 37/04* (2013.01); *B01J 37/08* (2013.01); *B01J 37/345* (2013.01); *C09D 1/00* (2013.01); *C09D 5/00* (2013.01); *C09D 7/12* (2013.01); *C09D 183/10* (2013.01); *C09D 201/00* (2013.01); *B01D 2255/20707* (2013.01); *B01D 2255/20761* (2013.01); *B01D 2255/802* (2013.01); *B01D 2257/91* (2013.01); *B01D 2257/93* (2013.01); *B01D 2259/802* (2013.01)

(58) Field of Classification Search
CPC ........ B01J 23/72; B01J 23/8875; B01J 23/28;
B01J 23/8472; B01J 23/835; B01J 23/22;
B01J 37/04; B01J 37/345; B01J 37/08;
B01J 35/006; B01J 35/004; B01J 21/063;
B01D 53/8687; B01D 2255/20761; B01D
2255/20707; B01D 2255/802; B01D
2257/93; B01D 2259/802; C09D 183/10;
C09D 7/12; C09D 201/00; C09D 1/00;
C09D 5/00
See application file for complete search history.

(56) References Cited

U.S. PATENT DOCUMENTS

| | | |
|---|---|---|
| 5,049,309 A | 9/1991 | Sakamoto et al. |
| 2005/0271892 A1 | 12/2005 | Ogata et al. |

(Continued)

FOREIGN PATENT DOCUMENTS

| | | |
|---|---|---|
| JP | 64-3020 A | 1/1989 |
| JP | 2-255532 A | 10/1990 |

(Continued)

OTHER PUBLICATIONS

International Search Report dated Nov. 12, 2013, issued in corresponding application No. PCT/JP2013/073635.

(Continued)

*Primary Examiner* — Anthony J Zimmer
(74) *Attorney, Agent, or Firm* — Westerman, Hattori, Daniels & Adrian, LLP

(57) ABSTRACT

It is possible to obtain a visible light-responsive photocatalytic nanoparticle dispersion liquid containing copper-containing titanium oxide nanoparticles by subjecting an aqueous peroxotitanic acid solution containing a copper compound to hydrothermal reaction for crystallizing the aqueous solution by means of heat under high pressure. The visible light-responsive photocatalytic nanoparticle dispersion liquid thus obtained exhibits excellent dispersion stability of titanium oxide nanoparticles within a water-based dispersion medium even when left in a cold and dark indoor area for a long period of time, expresses photocatalytic activity even in visible light (400 to 800 nm) alone, and can easily create a photocatalytic thin film which is extremely transparent and exhibits excellent durability, and in which the state of copper coordination when exposed to heat or ultraviolet rays is stable and cannot be easily modified.

13 Claims, No Drawings

(51) Int. Cl.
*C09D 1/00* (2006.01)
*C09D 5/00* (2006.01)
*C09D 7/12* (2006.01)
*C09D 183/10* (2006.01)
*C09D 201/00* (2006.01)
*B01D 53/86* (2006.01)
*B01J 35/00* (2006.01)

(56) References Cited

U.S. PATENT DOCUMENTS

| | | |
|---|---|---|
| 2012/0043506 A1 | 2/2012 | Ogata et al. |
| 2012/0045655 A1 | 2/2012 | Ogata et al. |
| 2012/0048144 A1 | 3/2012 | Ogata et al. |
| 2012/0214667 A1 | 8/2012 | Furudate et al. |
| 2014/0309103 A1 | 10/2014 | Furudate et al. |

FOREIGN PATENT DOCUMENTS

| | | |
|---|---|---|
| JP | 6-279725 A | 10/1994 |
| JP | 7-247119 A | 9/1995 |
| JP | 10-67516 A | 3/1998 |
| JP | 10-182152 A | 7/1998 |
| JP | 2002-177775 A | 6/2002 |
| JP | 2003-002646 A | 1/2003 |
| JP | 2004-182558 A | 7/2004 |
| JP | 2005-170687 A | 6/2005 |
| JP | 2009-148700 A | 7/2009 |
| JP | 2009-179497 A | 8/2009 |
| JP | 2011-136297 A | 7/2011 |
| JP | 2011-136879 A | 7/2011 |
| JP | 2011/145385 A1 | 11/2011 |
| JP | 2013-126654 A | 6/2013 |
| WO | 2004/041723 A1 | 5/2004 |
| WO | 2013/073320 A1 | 5/2013 |

OTHER PUBLICATIONS

Manabu Kiyono, "Titanium Oxide", Gihodo Publishing Co., (1991), pp. 16-27, cited in the Specification, w/ English translation.

Fumiaki Otani, "Scientific Methods in Photocatalysis—Standard Research of Photocatalysts", Tokyo Tosho Co., (2005), pp. 410-419, cited in the Specification, w/ English translation.

Office Action dated Oct. 4, 2016, issued in counterpart Japanese Patent Application No. 2016-002591. (3 pages).

VISIBLE LIGHT-RESPONSIVE PHOTOCATALYTIC NANOPARTICLE DISPERSION LIQUID, METHOD FOR PRODUCING SAME, AND MEMBER HAVING PHOTOCATALYTIC THIN FILM ON SURFACE

TECHNICAL FIELD

This invention relates to a visible-light-responsive photocatalytic fine particle dispersion comprising copper-containing titanium oxide fine particles for use as various catalysts, co-catalysts, antibacterial agents and the like; a method for manufacturing the same; and a member having on its surface a photocatalyst thin film which is formed using the dispersion. More particularly, it relates to a visible-light-responsive photocatalytic fine particle dispersion comprising copper-containing titanium oxide fine particles which is improved in dispersion stability of titanium oxide fine particles in an aqueous dispersing medium during long-term storage in an indoor cold dark place, and which facilitates formation of a photocatalyst thin film that exerts photocatalytic activity in response to even visible light (400-800 nm) alone, and is highly transparent, less alterable under exposure to heat or UV due to the stable coordinated state of copper, and fully durable; a method for manufacturing the same; and a member having on its surface a photocatalyst thin film which is formed using the dispersion.

BACKGROUND ART

Copper element or copper-containing metal oxides are widely used in the industry, and in particular, many examples of their use are found in the co-catalyst and antibacterial fields. On use as the co-catalyst, they are currently used for the sensitization of photocatalysts to visible light, and as asymmetric catalysts for organic synthesis, ATRP polymerization catalysts for polymers, catalysts for steam modification of various organic compounds. It is also known from the past that copper element or copper ions have antibacterial activity. Even in recent years, research works are made on the mechanism of achieving bacteriostasis to sterilization via enzyme inhibition of target bacterium, denaturation of membrane protein, or denaturation of constitutional protein of organelle. While copper-containing catalysts are manufactured in expectation of these effects, they are generally manufactured by adding metal copper ions or as a single metal oxide having microparticulate copper oxide supported thereon. However, since these copper-containing metal oxides change their copper composition in the ambient environment including light, heat and moisture, all oxides are expected to exert high activity in catalyst sensitization and bacteria control at the initial, but deteriorate and lose their activity within several weeks at the fastest, raising a problem in the application where their activity must be sustained over a long term.

Titanium oxide finds use in a variety of applications, for example, pigments, UV screeners, catalysts, photocatalysts, catalyst carriers, adsorbents, ion exchangers, fillers, reinforcements, ceramic stock materials, precursors to complex oxides such as perovskite type complex oxides, and primers for magnetic tape.

Among others, photocatalytic titanium oxide fine powder is a material having photocatalytic activity under exposure to light including UV light of 400 nm or shorter. The photocatalytic activity refers to the action that positive holes and electrons generate by excitation of UV light of 400 nm or shorter, diffuse to a surface, and act with molecules adsorbed to the surface to undergo redox reaction. By the redox reaction, organic matter is decomposed when adsorbed to the titanium oxide surface. Once titanium oxide fine particles having such photocatalytic activity are applied to the substrate surface to form a photocatalyst thin film, harmful organic materials adsorbed thereto can be decomposed by irradiating excitation light. They are often used in applications including cleaning of the substrate surface, deodorizing, and sterilization. It is required to increase the contact area of photocatalyst particles with a material to be decomposed for the purpose of enhancing photocatalytic activity, and film transparency is required for the purpose of preserving the aesthetic appearance of a substrate to be coated. To meet these requirements, titanium oxide fine particles in the titanium oxide dispersion must have an average particle size of not more than 50 nm.

Furthermore, titanium oxide exerts satisfactory photocatalytic activity under exposure to light in the UV region of relatively short wavelength (wavelength 10 to 400 nm) in sunlight or the like, but is sometimes awkward to exert satisfactory photocatalytic activity in an indoor space with lighting from a light source mainly producing light in the visible region (wavelength 400 to 800 nm) such as fluorescent lamps. Recently, a tungsten oxide photocatalyst (Patent Document 1: JP-A 2009-148700) attracts attention as the visible-light-responsive photocatalyst. Since tungsten is a rare element, it is desired to enhance the visible light activity of a photocatalyst using a common element, titanium.

The general processes for preparing titanium oxide fine particles, which are industrially implemented, include the sulfate process using ilmenite ore or rutile ore and the chloride process (Non-Patent Document 1: Titanium Oxide, Gihodo Publishing Co.), as well as the hydrolysis/firing process, reaction in organic solvents, and the solid phase process (Non-Patent Document 2: Standard Research of Photocatalysts, Tokyo Tosho Co.). The resulting titanium oxide fine particles are subjected to ultrafine dispersion treatment into a coating liquid in order that titanium oxide fine particles be coated onto the substrate surface while maintaining the aesthetic appearance of the substrate to be coated. The general fine dispersion treatments include, for example, methods of dispersing a synthesized titanium oxide fine powder into dispersing medium with the aid of dispersing agents such as organic dispersants by a wet dispersing machine (Patent Document 2: JP-A H01-003020, Patent Document 3: JP-A H06-279725, Patent Document 4: JP-A H07-247119, Patent Document 5: JP-A 2004-182558), and methods of stably dispersing titanium oxide into dispersing medium by surface treatment of the titanium oxide (Patent Document 6: JP-A 2005-170687, Patent Document 7: JP-A 2009-179497). However, these manufacturing methods have the problem that since ultrafine particles with an average particle size of not more than 50 nm are prone to agglomerate, a great deal of labor is necessary in order to achieve dispersion up to primary particles, and in some cases, it is impossible to disperse up to primary particles; and the problem that when particles are surface treated with inorganic or organic components or when dispersing agents such as surfactants are added, both for the purpose of enhancing dispersion stability, the photocatalyst is surface-coated therewith, which becomes a factor of inhibiting the photocatalyst from exerting activity.

Also disclosed are the method of preparing an anatase type titanium oxide dispersion having long-term stability by hydrothermal treatment of a peroxotitanic acid solution obtained by dissolving titanium hydroxide with the aid of hydrogen peroxide (Patent Document 8: JP-A H10-67516); the method of preparing rutile type titanium oxide sol (Patent Document 9: JP-A H02-255532); and the method of preparing titanium oxide sol (Patent Document 10: JP-A H10-182152). In these dispersions, titanium oxide fine particles are kept dispersed without a need for surface treatment or dispersing agents while the average particle size is not more than 50 nm. Photocatalytic coating films obtained by coating substrates with the dispersions exhibit high transparency and activity under UV light exposure, but not sufficient visible light activity.

SUMMARY OF INVENTION

Technical Problem

An object of the invention, which has been made under the above-mentioned circumstances, is to provide a visible-light-responsive photocatalytic fine particle dispersion which is improved in long-term dispersion stability of titanium oxide fine particles in an aqueous dispersing medium without a need for addition of organic dispersing agents or surfactants which become the inhibitory factor against photocatalytic activity development, or surface treatment of titanium oxide particles, and which facilitates formation of a photocatalyst thin film that exerts photocatalytic activity in response to even visible light (400-800 nm) alone, and is highly transparent, less alterable under exposure to heat or UV due to the stable coordinated state of copper, and fully durable; a method for manufacturing the same; and a member having on its surface a photocatalyst thin film which is formed using the dispersion.

Solution to Problem

Making extensive investigations to attain the above objects, the inventors have found that only when copper-containing titanium oxide fine particles obtained by heating a peroxotitanic acid aqueous solution containing a copper compound as copper component under high pressure for crystallization are used, there is obtained a visible-light-responsive photocatalytic fine particle dispersion comprising copper-containing titanium oxide fine particles which is improved in long-term dispersion stability of titanium oxide fine particles in an aqueous dispersing medium, and which facilitates formation of a photocatalyst thin film that exerts photocatalytic activity in response to even visible light (400-800 nm) alone, and is highly transparent, less alterable under exposure to heat or UV due to the stable coordinated state of copper, and fully durable. The invention is predicated on this finding.

Specifically, the inventors previously proposed in JP-A 2013-126654 a titanium oxide fine particle dispersion comprising titanium oxide fine particles containing a peroxotitanium component, a vanadium component, and a tin component dispersed in an aqueous dispersing medium, and further comprising a copper component, which is manufactured by providing a starting titanium compound, a vanadium compound, a tin compound, a basic substance, hydrogen peroxide, and an aqueous dispersing medium to form a peroxotitanic acid solution containing the vanadium and tin compounds, subjecting the peroxotitanic acid solution to hydrothermal reaction under high pressure, and mixing the resulting dispersion with a copper compound. This titanium oxide fine particle dispersion is improved in dispersion stability of titanium oxide fine particles during long-term storage in an indoor cold dark place and facilitates formation of a highly transparent photocatalyst thin film capable of exerting photocatalytic activity in response to even visible light (400-800 nm) alone.

The relevant photocatalyst thin film maintains visible-light-responsive photocatalytic activity over a relatively long period of time under irradiation of visible light (400-800 nm) or illumination from fluorescent lamps containing only very weak UV. However, there was found a problem that the film experiences a substantial loss of visible-light-responsive photocatalytic activity when exposed to UV lamps containing rays of 400 nm or less or sunlight over a long period of time.

Also, the relevant photocatalyst thin film is manufactured for the intended application for use in an indoor space which is mostly illuminated by light of the visible region as from fluorescent lamps. In such an environment where the film is not exposed to UV over a long term, it is expected that the loss of photocatalytic activity is not so big. Since even the indoor space includes window and other areas which are exposed to sunlight, it is preferred to suppress the loss of photocatalytic activity by UV.

The difference between the present invention and the previous proposal (JP-A 2013-126654) resides in that when a copper component is incorporated into a dispersion, the present invention uses pre-formed titanium oxide fine particles containing peroxotitanium and copper components. More specifically, a dispersion of (i) titanium oxide fine particles containing a peroxotitanium component, a tin component, and a transition metal component (e.g., vanadium) for enhancing visible light response is mixed with another dispersion of (ii) titanium oxide fine particles containing a peroxotitanium component and a copper component, as in the method for preparing a dispersion, to be described later, for example.

Namely, in the dispersion of the previous proposal wherein a copper compound is simply mixed with the dispersion, the copper component is merely kept dispersed and/or dissolved in the dispersion. In the dispersion of the present invention, since titanium oxide fine particles (ii) are previously prepared by hydrothermal reaction of heating a peroxotitanic acid aqueous solution containing a copper compound under high pressure for crystallization and thereafter mixed with the dispersion, the copper component is mainly present in solid solution form within titanium oxide fine particles.

Therefore, a photocatalyst thin film formed from the dispersion of the present invention has further improved advantages including high photocatalytic activity and high transparency under visible light, and at the same time, is less alterable under exposure to heat or UV due to the stable coordinated state of copper, and thus fully durable against heat or UV.

Accordingly, the invention provides a visible-light-responsive photocatalytic fine particle dispersion, a method for manufacturing the same, and a member having on its surface a photocatalyst thin film, as defined below.

[1] A visible-light-responsive photocatalytic fine particle dispersion comprising two types of titanium oxide fine particles dispersed in an aqueous dispersing medium, the two types being (i) titanium oxide fine particles containing a peroxotitanium component, a tin component, and a transition metal component for enhancing visible light response, and (ii) titanium oxide fine particles containing a peroxotitanium component and a copper component.

[2] The visible-light-responsive photocatalytic fine particle dispersion of [1] wherein the titanium oxide fine particles (i) and (ii) each have a size as dispersed of 5 to 30 nm in a 50% volume cumulative distribution diameter ($D_{50}$) measured by the dynamic scattering method using laser light.

[3] The visible-light-responsive photocatalytic fine particle dispersion of [1] or [2] wherein the peroxotitanium component is present in an amount of 0.05 to 2% by weight based on the total weight of titanium oxide fine particles (i) and (ii).

[4] The visible-light-responsive photocatalytic fine particle dispersion of any one of [1] to [3] wherein in titanium oxide fine particles (i), the tin component is present in such an amount relative to the titanium oxide as to give a molar ratio (Ti/Sn) in a range from 10 to 1,000 and the transition metal component (transition metal M) is present in such an amount relative to the titanium oxide as to give a molar ratio (Ti/M) in a range from 10 to 10,000.

[5] The visible-light-responsive photocatalytic fine particle dispersion of any one of [1] to [4] wherein in titanium oxide fine particles (i), the transition metal of the transition metal component for enhancing visible light response is selected from among vanadium, iron, molybdenum, and chromium.

[6] The visible-light-responsive photocatalytic fine particle dispersion of any one of [1] to [5] wherein in titanium oxide fine particles (ii), the copper component is present in such an amount relative to the titanium oxide as to give a molar ratio (Ti/Cu) in a range from 1 to 1,000.

[7] The visible-light-responsive photocatalytic fine particle dispersion of any one of [1] to [6] wherein in titanium oxide fine particles (ii), the copper component forms a solid solution.

[8] A visible-light-responsive photocatalytic fine particle dispersion which is obtained by a method comprising the steps of:
(1) providing a starting titanium compound, a copper compound, a basic substance, hydrogen peroxide, and an aqueous dispersing medium to form a precursor aqueous solution containing the copper compound, and
(2) heating the precursor aqueous solution containing the copper compound obtained from step (1) at 80 to 250° C. under high pressure to form a copper-containing titanium oxide fine particle dispersion,
said dispersion having titanium oxide fine particles dispersed in the aqueous dispersing medium, the titanium oxide fine particles containing a peroxotitanium component and a copper component.

[9] The visible-light-responsive photocatalytic fine particle dispersion of [8] wherein the high pressure in step (2) is 0.12 to 4.5 MPa.

[10] The visible-light-responsive photocatalytic fine particle dispersion of [8] or [9] wherein the titanium oxide fine particles have a size as dispersed of 5 to 30 nm when expressed by a 50% by volume cumulative distribution diameter ($D_{50}$) measured by the dynamic scattering method using laser light.

[11] The visible-light-responsive photocatalytic fine particle dispersion of any one of [8] to [10] wherein the peroxotitanium component is present in an amount of 0.05 to 2% by weight based on the titanium oxide fine particles.

[12] The visible-light-responsive photocatalytic fine particle dispersion of any one of [8] to [11] wherein in the titanium oxide fine particles, the copper component is present in such an amount relative to the titanium oxide as to give a molar ratio (Ti/Cu) in a range from 1 to 1,000.

[13] The visible-light-responsive photocatalytic fine particle dispersion of any one of [1] to [12] wherein the titanium oxide fine particles containing a peroxotitanium component and a copper component,
before and after degradation treatment performed thereon by irradiating UV at 3 mW/cm$^2$ and a peak wavelength 365 nm for 200 hours or by heating at 500° C. for 2 hours,
on measurement of Cu K-edge XAFS (x-ray absorption fine structure) spectrum near energy 9,000 eV,
simultaneously satisfy the following two requirements that:
1) with respect to the maximum peak of absorption spectrum observed in the range of 8,970 to 9,000 eV in the XANES (x-ray absorption near edge structure) spectrum, a relative absorption amount does not undergo a change of at least 0.1 and an absorption energy value does not undergo a change of at least 5%, and
2) in the radial structure function obtained by fast Fourier transform of the $k^3\chi(k)$ Cu K-edge EXAFS (extended x-ray absorption fine structure) spectrum, obtained as the same measurement result, the maximum peak position within the range of 2 to 3 Å judged to fall in the first to second coordination spheres of Cu does not undergo a change of at least 5%.

[14] The visible-light-responsive photocatalytic fine particle dispersion of any one of [1] to [13], further comprising a binder.

[15] The visible-light-responsive photocatalytic fine particle dispersion of [14] wherein the binder is a silicon compound-based binder.

[16] A member having on its surface a photocatalyst thin film which is formed by using the visible-light-responsive photocatalytic fine particle dispersion of any one of [1] to [15].

[17] A method for manufacturing a visible-light-responsive photocatalytic fine particle dispersion, comprising the steps of:
(1) providing a starting titanium compound, a copper compound, a basic substance, hydrogen peroxide, and an aqueous dispersing medium to form a precursor aqueous solution containing the copper compound,
(2) heating the precursor aqueous solution containing the copper compound obtained from step (1) at 80 to 250° C. under high pressure to form a copper-containing titanium oxide fine particle dispersion,
(3) providing a starting titanium compound, a transition metal compound, a tin compound, a basic substance, hydrogen peroxide, and an aqueous dispersing medium to form a precursor aqueous solution containing the transition metal and tin compounds,
(4) heating the precursor aqueous solution containing the transition metal and tin compounds obtained from step (3) at 80 to 250° C. under high pressure to form a transition metal and tin-containing titanium oxide fine particle dispersion, and
(5) mixing the two types of titanium oxide fine particle dispersions obtained from steps (2) and (4) together.

[18] The method for manufacturing a visible-light-responsive photocatalytic fine particle dispersion of [17] wherein the transition metal of the transition metal compound is selected from among vanadium, iron, molybdenum, and chromium.

[19] A method for manufacturing a visible-light-responsive photocatalytic fine particle dispersion, comprising the steps of:
(1) providing a starting titanium compound, a copper compound, a basic substance, hydrogen peroxide, and an aqueous dispersing medium to form a precursor aqueous solution containing the copper compound, and (2) heating the precursor aqueous solution containing the copper compound obtained from step (1) at 80 to 250° C. under high pressure to form a copper-containing titanium oxide fine particle dispersion.

Advantageous Effects of Invention

According to the invention, there are provided a visible-light-responsive photocatalytic fine particle dispersion comprising copper-containing titanium oxide fine particles, which is improved in dispersion stability of titanium oxide fine particles in an aqueous dispersing medium during long-term storage in an indoor cold dark place, and which facilitates formation of a photocatalyst thin film that exerts photocatalytic activity in response to even visible light (400-800 nm) alone, and is highly transparent, less alterable under exposure to heat or UV due to the stable coordinated state of copper, and fully durable; a method for manufacturing the same; and a member having on its surface a photocatalyst thin film which is formed using the dispersion.

DESCRIPTION OF EMBODIMENTS

Described below in detail are the visible-light-responsive photocatalytic fine particle dispersion, the method for manufacturing the same, and the member having on its surface a photocatalyst thin film which is formed by using the dispersion, according to the invention.

[Visible-light-responsive Photocatalytic Fine Particle Dispersion]

The visible-light-responsive photocatalytic fine particle dispersion of the invention is obtained from hydrothermal reaction to be described later, and includes two embodiments, (I) a visible-light-responsive photocatalytic fine particle dispersion having titanium oxide fine particles dispersed in an aqueous dispersing medium, the titanium oxide fine particles containing a peroxotitanium component and a copper component, and (II) a visible-light-responsive photocatalytic fine particle dispersion having two types of titanium oxide fine particles dispersed in an aqueous dispersing medium, the two types being (i) titanium oxide fine particles containing a peroxotitanium component, a tin component, and a transition metal component for enhancing visible light response, and (ii) titanium oxide fine particles containing a peroxotitanium component and a copper component.

As titanium oxide fine particles, three types, rutile, anatase and brookite types are generally known. In either of dispersions (I) and (II), it is preferred to use mainly anatase or rutile type. As used herein, the term "mainly" means that the anatase or rutile type accounts for at least 50% by weight, preferably at least 70% by weight, more preferably at least 90% by weight and even 100% by weight of the overall titanium oxide fine particle crystals.

Also in either of dispersions (I) and (II), an aqueous solvent is used as the aqueous dispersing medium in which titanium oxide fine particles are dispersed. Typical of the aqueous solvent are water and a mixture of water and a hydrophilic organic solvent in an arbitrary ratio. Preferably the water is, for example, deionized water, distilled water, pure water or the like. Preferred examples of the hydrophilic organic solvent include alcohols such as methanol, ethanol and isopropanol. In this case, the hydrophilic organic solvent is preferably admixed in a proportion of 0 to 50% by weight, more preferably 0 to 20% by weight, and even more preferably 0 to 10% by weight of the aqueous dispersing medium. Among those, pure water is most preferred for productivity and cost.

In dispersions (I) and (II) having titanium oxide fine particles dispersed therein, the copper component contained in titanium oxide fine particles is to enhance the visible light response of a photocatalyst thin film and may be derived from copper compounds. Exemplary copper compounds include metallic copper, and oxides, hydroxides, nitrates, sulfates, halides and complex compounds of copper, which may be used alone or in combination of two or more.

The copper component is preferably contained in titanium oxide fine particles in such an amount relative to the titanium oxide as to give a molar ratio (Ti/Cu) in a range from 1 to 1,000, more preferably 10 to 200, and even more preferably 20 to 100. If the molar ratio is less than 1, the content proportion of crystalline titanium oxide may become lower, failing to fully exert the photocatalytic effect. If the molar ratio exceeds 1,000, satisfactory visible light activity may not be obtained and the visible light response may become insufficient.

It is noted that the copper component is preferably incorporated in titanium oxide fine particles as tightly as possible such that it may not be separated or liberated from the titanium oxide fine particles, rather than it is simply mixed with, adsorbed to or carried on titanium oxide fine particles, and more preferably incorporated in solid solution form in crystal lattices of titanium oxide fine particles. This is because the copper component in solid solution form ensures that the coordinated state of copper is stable against heat or UV exposure and facilitates to form a photocatalyst thin film which is less alterable and fully durable. The copper component in solid solution form is available from the method of preparing a visible-light-responsive photocatalytic fine particle dispersion, to be described later. It is acceptable that a portion of the copper component is separated or liberated from the titanium oxide fine particles and is kept dissolved and/or dispersed in the dispersion.

In dispersion (II), the transition metal component contained in the titanium oxide fine particles (i) is to enhance the visible light response of a photocatalyst thin film and may be derived from transition metal compounds. Examples of the transition metal compound include various transition metals, and oxides, hydroxides, nitrates, sulfates, halides and complex compounds of transition metals, which may be used alone or in combination of two or more. Suitable transition metals of the transition metal component include vanadium, iron, molybdenum and chromium, with vanadium, molybdenum and iron being preferred.

The transition metal component (transition metal M) is preferably contained in titanium oxide fine particles in such an amount relative to the titanium oxide as to give a molar ratio (Ti/M) in a range from 10 to 10,000, more preferably 100 to 10,000, and even more preferably 100 to 5,000. If the molar ratio is less than 10, the content proportion of crystalline titanium oxide may become so low that satisfactory visible light activity may not be obtained, failing to fully exert the photocatalytic effect. If the molar ratio exceeds 10,000, the visible light response may become insufficient.

It is noted that the transition metal component is also preferably incorporated in titanium oxide fine particles as tightly as possible such that it may not be separated or liberated from the titanium oxide fine particles, rather than it is simply mixed with, adsorbed to or carried on titanium oxide fine particles. More preferably at least a portion of the transition metal component is incorporated in solid solution form in crystal lattices of titanium oxide fine particles, for the purpose of enhancing the visible light absorbing ability of titanium oxide fine particles. The transition metal component in solid solution form is available from the method of preparing a visible-light-responsive photocatalytic fine particle dispersion, to be described later. It is acceptable that another portion of the transition metal component is separated or liberated from the titanium oxide fine particles and is kept dissolved and/or dispersed in the dispersion.

In dispersion (II), the tin component contained in titanium oxide fine particles (i) serves to enhance the visible light response of the photocatalyst thin film and may be derived from tin compounds. Examples of the tin compound include metallic tin and oxides, hydroxides, nitrates, sulfates, halides and complex compounds of tin, which may be used alone or in combination of two or more.

The tin component is preferably contained in titanium oxide fine particles in such an amount relative to the titanium oxide as to give a molar ratio (Ti/Sn) in a range from 10 to 1,000, more preferably 10 to 500, and even more preferably 20 to 100. If the molar ratio is less than 10, the content proportion of titanium oxide may become lower, failing to fully exert the photocatalytic effect. If the molar ratio exceeds 1,000, satisfactory visible light activity may not be obtained and the visible light response may become insufficient.

It is noted that the tin component is also preferably incorporated in titanium oxide fine particles as tightly as possible such that it may not be separated or liberated from the titanium oxide fine particles, rather than it is simply mixed with, adsorbed to or carried on titanium oxide fine particles. More preferably at least a portion of the tin component is incorporated in solid solution form in crystal lattices of titanium oxide fine particles, for the purpose of enhancing the visible light absorbing ability of titanium oxide fine particles. The tin component in solid solution form is available from the method of preparing a visible-light-responsive photocatalytic fine particle dispersion, to be described later. It is acceptable that another portion of the tin component is separated or liberated from the titanium oxide fine particles and is kept dissolved and/or dispersed in the dispersion.

In dispersions (I) and (II), the peroxotitanium component contained in titanium oxide fine particles functions to help titanium oxide fine particles to disperse in an aqueous dispersing medium, and refers to a peroxotitanium compound, that is, a titanium oxide compound having Ti—O—O—Ti linkage (inclusive of peroxotitanium complex). The peroxotitanium component is formed, for example, in the step of synthesizing a peroxotitanic acid solution, to be described later, i.e., upon reaction of a starting titanium compound, basic substance, and hydrogen peroxide.

The peroxotitanium component must be contained not only in titanium oxide fine particles in dispersions (I) and (II), but also in the respective dispersions. The concentration of peroxotitanium component in the dispersion is 0.05 to 2% by weight, preferably 0.05 to 1% by weight, based on the overall titanium oxide fine particles in the case of dispersion (I), or based on the total weight of titanium oxide fine particles (i) and (ii) in the case of dispersion (II). If the concentration is less than 0.05 wt %, titanium oxide fine particles are sometimes prone to agglomerate together, adversely affecting the dispersed state of titanium oxide fine particles in the dispersion and detracting from the stability of the dispersion and the transparency of a photocatalyst thin film. If the concentration exceeds 2 wt %, a photocatalyst thin film formed from the dispersion may have insufficient photocatalytic effect.

Preferably the titanium oxide fine particles in dispersions (I) and (II) have a 50% volume cumulative distribution diameter ($D_{50}$) (referred to as "average particle size", hereinafter) of 5 to 30 nm, more preferably 5 to 20 nm, and even more preferably 5 to 15 nm, as measured by the dynamic scattering method using laser light. If the average particle size is less than 5 nm, photocatalytic activity may become insufficient. In excess of 30 nm, the dispersion may become opaque. Notably the analyzer used for measuring average particle size may be, for example, Nanotrac UPA-EX 150 (Nikkiso Co., Ltd.) or LA-910 (Horiba, Ltd.).

For dispersions (I) and (II), the concentration of titanium oxide fine particles in dispersion (I) and the concentration of the total of titanium oxide fine particles (i) and (ii) in dispersion (II) are each preferably 0.01 to 20% by weight, more preferably 0.5 to 10% by weight from the aspect of ease of formation of a photocatalyst thin film having a predetermined thickness. This concentration range ensures that titanium oxide fine particles dispersed in an aqueous dispersing medium maintain chemical stability and is convenient to form a catalyst thin film using the dispersion directly.

[Method for Manufacturing Visible-light-responsive Photocatalytic Fine Particle Dispersion]

The visible-light-responsive photocatalytic fine particle dispersion (I) of the invention is obtained via steps involving hydrothermal reaction and in a state that titanium oxide fine particles containing a peroxotitanium component and a copper component are dispersed in an aqueous dispersing medium.

Namely, the method for manufacturing the visible-light-responsive photocatalytic fine particle dispersion (I) comprises the following steps (1) and (2):

(1) providing a starting titanium compound, a copper compound, hydrogen peroxide, and an aqueous dispersing medium to form a precursor aqueous solution containing the copper compound, and (2) heating the precursor aqueous solution containing the copper compound obtained from step (1) at 80 to 250° C. under high pressure to form a copper-containing titanium oxide fine particle dispersion.

Step (1):

Step (1) is to react a starting titanium compound, a copper compound, a basic substance, and hydrogen peroxide in an aqueous dispersing medium, to form a precursor aqueous solution containing the copper compound. The reaction mode may be either by adding a basic substance to a starting titanium compound in an aqueous dispersing medium to convert it to titanium hydroxide, removing impurity ions, adding hydrogen peroxide for dissolution, thereafter adding a copper compound to form copper compound-containing precursor aqueous solution; or by adding a copper compound to a starting titanium compound in an aqueous dispersing medium, then adding a basic substance thereto to form copper-containing titanium hydroxide, removing impurity ions, and adding hydrogen peroxide for dissolution to form copper compound-containing precursor aqueous solution.

Examples of the starting titanium compound used herein include salts of titanium with mineral acids such as hydrochloric acid, nitric acid, and sulfuric acid, salts of titanium with organic acids such as formic acid, citric acid, oxalic acid, lactic acid and glycolic acid, and titanium hydroxide obtained by adding an alkali to an aqueous solution of such salt and allowing for hydrolysis and precipitation, which may be used alone or in combination of two or more.

As the copper compound and the aqueous dispersing medium, any of the aforementioned compounds and media may be used in the aforementioned formulation. Notably, the starting titanium compound aqueous solution composed of the starting titanium compound and the aqueous dispersing medium preferably has a concentration of up to 60% by weight, more preferably up to 30% by weight. The lower limit of concentration may be selected as appropriate, although a concentration of at least 1% by weight is usually preferred.

The basic substance serves to convert the starting titanium compound to titanium hydroxide and to stabilize the precursor component in the aqueous dispersing medium. Examples include hydroxides of alkali and alkaline earth metals such as sodium hydroxide and potassium hydroxide, and amine compounds such as ammonia, alkanol amines and alkyl amines. It is added and used in such an amount as to keep the starting titanium compound aqueous solution at pH 7 or higher, especially pH 7 to 10. The basic substance may also be used as an aqueous solution of a suitable concentration along with the aqueous dispersing medium.

Hydrogen peroxide serves to dissolve the starting titanium compound or titanium hydroxide and is typically used in the form of aqueous hydrogen peroxide. Hydrogen peroxide is preferably added in a molar amount of 1.5 to 10 times the total moles of Ti and Cu. When the reaction to dissolve the starting titanium compound or titanium hydroxide takes place as a result of hydrogen peroxide being added, the reaction temperature is preferably in a range of 5 to 60° C. and the reaction time is preferably in a range of 30 minutes to 24 hours.

In this way, there is obtained a precursor aqueous solution containing the copper compound, which may contain an alkaline or acidic substance for pH adjustment or other purposes. As used herein, examples of the alkaline substance include ammonia, sodium hydroxide, and calcium hydroxide; and examples of the acidic substance include mineral acids such as sulfuric acid, nitric acid, hydrochloric acid, carbonic acid, phosphoric acid and hydrogen peroxide, and organic acids such as formic acid, citric acid, oxalic acid, lactic acid and glycolic acid. It is preferred for safety of handling that the precursor aqueous solution containing the copper compound is at pH 1 to 7, especially pH 4 to 7.

Step (2):

In step (2), the copper compound-containing precursor aqueous solution resulting from step (1) is subjected to hydrothermal reaction at a temperature of 80 to 250° C., preferably 100 to 250° C., and more preferably 120 to 250° C. under high pressure. From the standpoints of reaction efficiency and reaction control, an appropriate reaction temperature is 80 to 250° C. As a result, copper-containing titanium oxide fine particles precipitate out. In this step, the pressure is preferably as high as about 0.12 to 4.5 MPa, more preferably about 0.15 to 4.5 MPa, and even more preferably about 0.20 to 4.5 MPa. The reaction time is preferably 1 minute to 24 hours.

From step (2), there is obtained a visible-light-responsive photocatalytic fine particle dispersion of titanium oxide fine particles containing peroxotitanium and copper components in an aqueous dispersing medium. As used herein, the peroxotitanium component refers to a titanium oxide compound having Ti—O—O—Ti linkage, as defined previously, and encompasses peroxotitanic acid and a peroxotitanium complex produced by reaction of Ti(VI) with hydrogen peroxide. Also, the copper component means a copper compound inclusive of metallic copper, and encompasses the aforementioned copper compounds.

With respect to the visible-light-responsive photocatalytic fine particle dispersion resulting from step (2), it is preferred for the same reason as above that the content of peroxotitanium component, the average particle size of titanium oxide fine particles, and the concentration of titanium oxide fine particles fall in the above-defined ranges.

Since the visible-light-responsive photocatalytic fine particle dispersion is obtained from hydrothermal reaction of heating under high pressure a peroxotitanic acid aqueous solution containing a copper compound for crystallization, the copper component is incorporated in solid solution form in crystal lattices of titanium oxide fine particles. Accordingly, the coordinated state of copper is stable against heat and UV exposure, and in particular, the titanium oxide fine particles are less alterable. A photocatalyst thin film having high durability may be formed.

The stability of copper-containing titanium oxide fine particles in the visible-light-responsive photocatalytic fine particle dispersion against heat and ultraviolet (UV) radiation exposure may be determined, for example, by heat drying the dispersion at 100° C. to yield dry copper-containing titanium oxide powder, and analyzing the Cu coordinated state of the dry powder before and after heat or UV exposure by XAFS (x-ray absorption fine structure) spectroscopy.

The copper-containing titanium oxide fine particles in the visible-light-responsive photocatalytic fine particle dispersion, before and after degradation treatment performed thereon by irradiating UV at 3 mW/cm$^2$ and a peak wavelength 365 nm for 200 hours or by heating at 500° C. for 2 hours, on measurement of Cu K-edge XAFS (x-ray absorption fine structure) spectrum near energy 9,000 eV, simultaneously satisfy the following two requirements that:

1) with respect to the maximum peak of absorption spectrum observed in the range of 8,970 to 9,000 eV in the XANES (x-ray absorption near edge structure) spectrum, a relative absorption amount does not undergo a change of at least 0.1, preferably at least 0.09 and an absorption energy value does not undergo a change of at least 5%, preferably at least 4%, more preferably at least 3%, and 2) in the radial structure function obtained by fast Fourier transform of the $k^3\chi(k)$ Cu K-edge EXAFS (extended x-ray absorption fine structure) spectrum, obtained as the same measurement result, the maximum peak position within the range of 2 to 3 Å judged to fall in the first to second coordination spheres of Cu does not undergo a change of at least 5%, preferably at least 4%, and more preferably at least 3%.

The stability of the Cu coordination state is attributable to the fact that the copper component is incorporated in solid solution form in crystal lattices of titanium oxide fine particles rather than it is simply mixed with, adsorbed to or carried on titanium oxide fine particles.

The other embodiment of the invention, visible-light-responsive photocatalytic fine particle dispersion (II) is obtained via steps including hydrothermal reaction, as a dispersion having two types of titanium oxide fine particles dispersed in an aqueous dispersing medium, the two types being (i) titanium oxide fine particles containing a peroxotitanium component, a tin component, and a transition metal component for enhancing visible light response, and (ii) titanium oxide fine particles containing a peroxotitanium component and a copper component.

That is, the method for manufacturing the visible-light-responsive photocatalytic fine particle dispersion (II) is defined as comprising the steps (1) to (5):

(1) providing a starting titanium compound, a copper compound, a basic substance, hydrogen peroxide, and an aqueous dispersing medium to form a precursor aqueous solution containing the copper compound, (2) heating the precursor aqueous solution containing the copper compound obtained from step (1) at 80 to 250° C. under high pressure to form a copper-containing titanium oxide fine particle dispersion ($TiO_2$:Cu), (3) providing a starting titanium compound, a transition metal compound, a tin compound, a basic substance, hydrogen peroxide, and an aqueous dispersing medium to form a precursor aqueous solution containing the transition metal and tin compounds, (4) heating the precursor aqueous solution containing the transition metal and tin compounds obtained from step (3) at 80 to 250° C. under high pressure to form a transition metal (M) and tin-containing titanium oxide fine particle dispersion ($TiO_2$:Sn,M), and (5) mixing the two types of titanium oxide fine particle dispersions obtained from steps (2) and (4) together.

It is noted that the transition metal (M) of the transition metal compound is selected from among vanadium, iron, molybdenum and chromium, with vanadium, molybdenum and iron being preferred.

Steps (1) and (2):

Steps (1) and (2) are identical with steps (1) and (2) in the aforementioned method for manufacturing the visible-light-responsive photocatalytic fine particle dispersion (I).

Accordingly, at the end of steps (1) and (2), the copper component is incorporated in solid solution form in crystal lattices of titanium oxide fine particles, and the titanium oxide fine particles ensure the stability of the copper coordination state against heat or UV exposure as analyzed by XAFS spectrum.

In this way, a dispersion of titanium oxide fine particles containing peroxotitanium and copper components (in solid solution form) in an aqueous dispersing medium is obtained from steps (1) and (2).

The content of peroxotitanium component in the dispersion resulting from step (2) is preferably 0.05 to 2% by weight based on the titanium oxide fine particles. The reason is that a concentration of less than 0.05 wt % may allow titanium oxide fine particles to agglomerate together, whereas a concentration in excess of 2 wt % may result in a photocatalyst thin film having insufficient photocatalytic effect.

Another reason is associated with the final step (5) of mixing the titanium oxide fine particle dispersion (ii) resulting from step (2) and the titanium oxide fine particle dispersion (i) resulting from step (4) to produce a visible-light-responsive photocatalytic fine particle dispersion. In order that the content of peroxotitanium component in the final dispersion is 0.05 to 2% by weight, preferably 0.05 to 1% by weight based on the titanium oxide, presetting a peroxotitanium content of equivalent value is convenient for the storage, maintenance and other operation of the dispersion, for example.

The average particle size of titanium oxide fine particles in the visible-light-responsive photocatalytic fine particle dispersion resulting from step (2) is preferably in the above-defined range for the aforementioned reason.

Step (3):

Step (3) is to react a starting titanium compound, a transition metal compound, a tin compound, a basic substance, and hydrogen peroxide in an aqueous dispersing medium, to form a precursor aqueous solution containing the transition metal and tin compounds. The reaction mode may be either by adding a basic substance to a starting titanium compound in an aqueous dispersing medium to convert it to titanium hydroxide, removing impurity ions, adding hydrogen peroxide for dissolution, thereafter adding a transition metal compound and a tin compound to form a precursor aqueous solution containing the transition metal and tin compounds; or by adding a transition metal compound and a tin compound to a starting titanium compound in an aqueous dispersing medium, then adding a basic substance thereto to form transition metal and tin-containing titanium hydroxide, removing impurity ions, and adding hydrogen peroxide for dissolution to form a precursor aqueous solution containing the transition metal and tin compounds.

As the starting titanium compound, transition metal compound, tin compound, basic substance, hydrogen peroxide, and aqueous dispersing medium used herein, any of the aforementioned ones may be used so as to meet the aforementioned formulation. The starting titanium compound aqueous solution composed of the starting titanium compound and the aqueous dispersing medium preferably has a concentration of up to 60% by weight, more preferably up to 30% by weight. The lower limit of concentration may be selected as appropriate, although a concentration of at least 1% by weight is usually preferred.

In this way, there is obtained a precursor aqueous solution containing the transition metal and tin compounds, which may contain an alkaline or acidic substance for pH adjustment or other purposes. As used herein, examples of the alkaline substance include ammonia, sodium hydroxide, and calcium hydroxide; and examples of the acidic substance include mineral acids such as sulfuric acid, nitric acid, hydrochloric acid, carbonic acid, phosphoric acid and hydrogen peroxide, and organic acids such as formic acid, citric acid, oxalic acid, lactic acid and glycolic acid. It is preferred for safety of handling that the precursor aqueous solution containing the transition metal and tin compounds is at pH 1 to 7, especially pH 4 to 7.

Step (4):

In step (4), the transition metal/tin compound-containing precursor aqueous solution resulting from step (3) is subjected to hydrothermal reaction at a temperature of 80 to 250° C., preferably 100 to 250° C., and more preferably 120 to 250° C. under high pressure. From the standpoints of reaction efficiency and reaction control, an appropriate reaction temperature is 80 to 250° C. As a result, the transition metal/tin-containing titanium oxide fine particles precipitate out. In this step, the pressure is preferably as high as about 0.01 to 4.5 MPa, more preferably about 0.12 to 4.5 MPa, even more preferably about 0.15 to 4.5 MPa, and further preferably about 0.20 to 4.5 MPa. The reaction time is preferably 1 minute to 24 hours.

From step (4), there is obtained a dispersion of (i) titanium oxide fine particles containing peroxotitanium, transition metal and tin components. Herein, the peroxotitanium component refers to a titanium oxide compound having Ti—O—O—Ti linkage, and encompasses peroxotitanic acid and a peroxotitanium complex produced by reaction of Ti(VI) with hydrogen peroxide, as previously mentioned. The transition metal component refers to a transition metal base compound inclusive of elemental transition metal, and encompasses the above-mentioned transition metal compounds. The tin component refers to a tin base compound inclusive of metallic tin, and encompasses the above-mentioned tin compounds.

The content of peroxotitanium component in the dispersion resulting from step (4) is 0.05 to 2% by weight, preferably 0.05 to 1% by weight based on the titanium oxide. The reason is that a concentration of less than 0.05 wt % may allow titanium oxide fine particles to agglomerate together, whereas a concentration in excess of 2 wt % may result in a photocatalyst thin film having insufficient photocatalytic effect.

Another reason is associated with the final step (5) of mixing the titanium oxide fine particle dispersion (ii) resulting from step (2) and the titanium oxide fine particle dispersion (i) resulting from step (4) to produce a visible-light-responsive photocatalytic fine particle dispersion. In order that the content of peroxotitanium component in the final dispersion is 0.05 to 2% by weight, preferably 0.05 to 1% by weight based on the titanium oxide, presetting a peroxotitanium content of equivalent value is convenient for the storage, maintenance and other operation of the dispersion, for example.

The average particle size of titanium oxide fine particles in the visible-light-responsive photocatalytic fine particle dispersion resulting from step (4) is preferably in the above-defined range for the aforementioned reason.

Since steps (3) and (4) follow the same procedure as the aforementioned steps (1) and (2) except that different components are contained in titanium oxide fine particles, at least portions of the transition metal and tin components are incorporated in solid solution form in crystal lattices of titanium oxide fine particles.

Step (5):

In step (5), the dispersions of two types of titanium oxide fine particles (i) and (ii) resulting from steps (2) and (4), respectively, are mixed together. The mixing mode is not particularly limited and may be by agitating on an agitating machine, or dispersing on a ultrasonic dispersing machine. Preferably the temperature during mixing is 20 to 100° C. and the time is 1 minute to 3 hours. With respect to the mixing ratio, the dispersions are preferably mixed such that the weight ratio of $(TiO_2{:}Sn,M)/(TiO_2{:}Cu)$ may range from 99 to 0.01, more preferably from 9 to 0.1, and even more preferably from 4 to 0.25. If the weight ratio is more than 99 or less than 0.01, then visible light activity may become insufficient.

The content of peroxotitanium component, the average particle size and concentration of titanium oxide fine particles in the visible-light-responsive photocatalytic fine particle dispersion thus obtained are preferably in the above-defined ranges for the aforementioned reasons.

It is noted that since the visible-light-responsive photocatalytic fine particle dispersion is a mixture of the dispersion of titanium oxide fine particles (ii) resulting from step (2) and the dispersion of titanium oxide fine particles (i) resulting from step (4), preferably the peroxotitanium component is present in the visible-light-responsive photocatalytic fine particle dispersion in such a state that at least a portion of the peroxotitanium component is present in the interior or on the surface of titanium oxide fine particles. It is needless to say that the other portion is preferably dissolved and/or dispersed in the dispersion.

The visible-light-responsive photocatalytic fine particle dispersions (I) and (II) thus obtained are significantly improved in dispersion stability of titanium oxide fine particles in that even when held in an indoor cold dark place for a long period of about 6 months, the dispersion is effective for preventing the average particle size of titanium oxide fine particles from gaining an increase of more than 30% of the initial size of particles as prepared. As used herein, the term "cold dark place" refers to a cold place kept at about 10 to 25° C. and a dark place shaded from direct sunlight or direct light from indoor luminaires, and examples of the cold dark place are chemicals storages, underground storerooms and the like.

To each of the visible-light-responsive photocatalytic fine particle dispersions (I) and (II), a binder may be added for the purposes of facilitating application of the dispersion to the surface of a member (to be described later) and bonding of fine particles to the member surface. Specifically the binder, typically a silicon compound-based binder is added in such amounts that the weight ratio of silicon compound to titanium oxide may range from 1:99 to 99:1, more preferably from 10:90 to 90:10, and even more preferably from 30:70 to 70:30. The silicon compound-based binder used herein refers to a colloidal dispersion, solution or emulsion containing a solid or liquid silicon compound in an aqueous dispersing medium. Examples include colloidal silica, solutions of silicic acid salts such as silicates, emulsions of silane or siloxane hydrolyzates, silicone resin emulsions, and emulsions of copolymers of silicone resins with other resins such as silicone-acrylic resin copolymers and silicone-urethane resin copolymers.

[Member having Photocatalyst Thin Film on Surface]

The visible-light-responsive photocatalytic fine particle dispersions (I) and (II) may be used to form a photocatalyst thin film on the surface of various members. The member used herein is not particularly limited, and examples of the material of which the member is made include organic and inorganic materials. These materials may have any desired shape depending on a particular purpose and application.

Examples of the organic material include synthetic resins such as vinyl chloride resins (PVC), polyethylene (PE), polypropylene (PP), polycarbonate (PC), acrylic resins, polyacetal, fluoro-resins, silicone resins, ethylene-vinyl acetate copolymers (EVA), acrylonitrile-butadiene rubber (NBR), polyethylene terephthalate (PET), polyethylene naphthalate (PEN), polyvinyl butyral (PVB), ethylene-vinyl alcohol copolymers (EVOH), polyimide resins, polyphenylene sulfide (PPS), polyether imide (PEI), polyether ether imide (PEEI), polyether ether ketone (PEEK), melamine resins, phenolic resins, acrylonitrile-butadiene-styrene (ABS) resins; naturally occurring materials such as natural rubber; and semi-synthetic materials of the foregoing synthetic resin materials and naturally occurring materials. These materials may be processed into products of a predetermined shape or structure such as film, sheet, textile materials, textile products, otherwise shaped parts, and laminates.

The inorganic materials include non-metallic inorganic materials and metallic inorganic materials.

Examples of the non-metallic inorganic materials include glass, ceramics, and stone. These materials may be processed into products of a suitable shape such as tiles, glass plates, mirrors, wall members, and decorative members.

Examples of the metallic inorganic materials include cast iron, steel, iron, iron alloys, aluminum, aluminum alloys, nickel, nickel alloys, and die cast zinc. These metallic materials may be plated with the metallic inorganic materials or coated with the organic materials, or be a plating applied to the surface of the organic materials or non-metallic inorganic materials.

Among a variety of members mentioned above, the visible-light-responsive photocatalytic fine particle dispersion of the invention is especially useful in forming a transparent photocatalyst thin film on a polymer sheet such as PET.

In one exemplary method for forming a photocatalyst film on the surface of a member, for example, the visible-light-responsive titanium oxide fine particle dispersion may be applied to the member surface by any well-known coating techniques such as spray coating and dip coating, and the coating be dried by any well-known drying techniques such as far-infrared drying, IH drying and hot air drying. While the thickness of the photocatalyst film may vary over a wide range, a range of 50 nm to 10 µm is preferred in most cases.

The photocatalyst film thus formed is transparent, exhibits satisfactory photocatalytic effect not only in response to light of the UV region (10 to 400 nm) as in the prior art, but also in response to light of the visible region (400 to 800 nm) alone to which prior art photocatalysts fail to exert satisfactory photocatalytic effect. The member having the photocatalyst film formed thereon is effective for cleaning of the member surface, deodorizing and sterilization because any organic matter adsorbed to the member surface can be decomposed by the photocatalytic action of titanium oxide.

EXAMPLES

Examples and Comparative Examples are given below by way of illustration although the invention is not limited thereto. Notably, measurements were carried out as follows.
(1) Average Particle Size ($D_{50}$) of Copper-containing Titanium Oxide Fine Particles Average particle size ($D_{50}$) of titanium oxide fine particles in a dispersion was measured using a particle size distribution measuring system (trade name "Nanotrac particle size analyzer UPA-EX150" by Nikkiso Co., Ltd.).
(2) Stability of Copper-containing Titanium Oxide Fine Particle Dispersion The dispersion stability of titanium oxide fine particles was examined by using the particle size distribution measuring system and comparing the average particle size on the date of preparation with the average particle size after stationary storage in an indoor cold dark place at 25° C. for 6 months, and rated according to the following criterion.
  Good (expressed by ○): difference≤+30%
  Fair (expressed by Δ): +30%<difference≤+50%
  Poor (expressed by x): difference>+50% or particles settled on container bottom
(3) Presence of Peroxotitanium Component in Copper-containing Titanium Oxide Fine Particles The presence of peroxotitanium component in titanium oxide fine particles was confirmed by detecting an O—O bond in a peroxo group. Specifically, the titanium oxide fine particle dispersion prepared was dried in air at room temperature, yielding a powder of titanium oxide fine particles. On analysis of the powder by an IR spectrophotometer (trade name "System 2000" by PerkinElmer Inc.), the appearance of a peak of O—O bond near 900 $cm^{-1}$ was observed.
(4) Concentration of Peroxotitanium Component in Copper-containing Titanium Oxide Fine Particle Dispersion The concentration of peroxotitanium component in a titanium oxide fine particle dispersion was measured by the hydrogen peroxide absorptiometry. Specifically, the titanium oxide fine particle dispersion was made acidic with sulfuric acid, which was reacted with the peroxotitanium component to develop color. Using a UV/Vis/IR spectrophotometer (trade name "Lambda 950" by PerkinElmer Inc.), the intensity at wavelength 410 nm was measured. The concentration was computed from a relative intensity to the Ti standard solution.
(5) UV Exposure of Copper-containing Titanium Oxide A dry powder sample of copper-containing titanium oxide was exposed to UV for 200 hours using UV-LED (model "HLDL-432×336UV365-FN", CCS Inc.) tailored so as to provide a UV intensity of 3 mW/$cm^2$ at the sample surface and a peak wavelength of 365 nm.
(6) Heat Exposure of Copper-containing Titanium Oxide A dry powder sample of copper-containing titanium oxide was exposed to heat in an electric furnace at 500° C. for 2 hours.
(7) Copper Coordination State of Copper-containing Titanium Oxide The copper coordination state of copper-containing titanium oxide was evaluated by x-ray absorption spectroscopy (XAS). Specifically, according to the following procedures (a) to (c), Cu—K shell absorption edge XAFS (x-ray absorption fine structure) spectrum was measured by using Engineering Science Research II Beamline (BL14B2) in the large synchrotron radiation facility SPring-8 of the Japan Synchrotron Radiation Research Institute, and the transmitted light measuring unit in the facility.
  (a) Sample Preparation
  Each sample prepared as dry powder was mixed with a predetermined amount of BN (boron nitride, reagent grade, by Kanto Kagaku Co., Ltd.) so that a pellet of 0.5 mm thick might have an absorption coefficient µt of 1. Using a tablet machine, the mixture was molded into pellets of 0.5 mm thick.
  (b) Measurement
  The pellets were sealed in transparent PP bags, which were set in an auto-sampler in the hatch of BL14B2, whereupon all x-ray absorption spectra near 8,800 to 9,600 eV were measured by the transmission method.
  (c) Analysis
  The resulting spectral data were analyzed using GUI frontend "Athena" and "Artemis" of IfeFFit. The XANES region was by spectral comparison evaluation. With respect to the maximum peak of absorption spectrum observed in the range of 8,970 to 9,000 eV in particular, a sample is rated "○" when the relative absorption amount does not undergo a change of at least 0.1 as compared with that prior to degradation treatment, and the absorption energy value does not undergo a change of at least 5% from the original, and a sample is rated "x" when either one of these is not met and a spectral change is observed.

With respect to the EXAFS function $k^3\chi(k)$, the radial structure function was obtained by fast Fourier transform. The peak position observed within the range of 2 to 3 Å from the second coordination sphere of Cu was evaluated by comparing it with the blank.
(8) Transparency of Photocatalyst Thin Film A glass plate as the substrate was measured for a haze value (%). Next, the dispersion was coated onto the glass plate and dried to form a photocatalyst thin film. The glass plate having the thin film thereon was measured for a haze value. The haze value of the photocatalyst thin film was computed from the difference. For haze measurement, a haze meter (trade name "Digital Haze Meter NDH-200" by Nippon Denshoku Co., Ltd.) was used. The transparency of a photocatalyst thin film was evaluated according to the following criterion in terms of the difference between haze values.
  Good (expressed by ○): difference≤+1%
  Fair (expressed by Δ): +1%<difference≤+3%
  Poor (expressed by x): difference>+3%
(9) Acetaldehyde Gas Decomposition Test of Photocatalyst Thin Film (under LED Illumination)

A photocatalyst thin film prepared by coating and drying the dispersion was evaluated for activity in terms of decomposition reaction of acetaldehyde gas. The evaluation was by a batchwise gas decomposition performance test.

Specifically, in a 5-L volume stainless steel cell with a quartz glass window, a test sample having a 50-mg photocatalyst thin film formed on a A4-size PET sheet was placed. The cell was filled with an acetaldehyde gas having a concentration of 5 ppm and conditioned to a humidity of 50%. An LED unit (trade name "TH-211×200SW", CCS Inc., spectral band 400-800 nm) installed above the cell was operated to irradiate light at an illuminance of 30,000 lx. As the acetaldehyde gas was decomposed with the aid of the photocatalyst on the thin film, the concentration of acetaldehyde gas in the cell decreased. By measuring the concentration, the amount of acetaldehyde gas decomposed could be determined. The acetaldehyde gas concentration was measured by a photoacoustic multi-gas monitor (trade name "INNOVA 1412", LumaSense Technologies Inc.). Evaluation was made by comparing the concentration of residual acetaldehyde gas after 12 hours of illumination.

(10) UV Durability Test of Photocatalyst Thin Film (under UV-LED Illumination)

The test sample prepared in above (9) was exposed to UV for 200 hours using UV-LED (model "HLDL-432× 336UV365-FN", CCS Inc.) tailored so as to provide a UV intensity of 3 mW/cm$^2$ at the sample surface.

After the UV exposure for 200 hours, the sample was evaluated by the acetaldehyde gas decomposition performance test under LED illumination as in above (9). A percent decomposition was compared before and after the UV exposure and rated according to the following criterion wherein the difference=(percent acetaldehyde gas decomposition of sample before UV exposure)−(percent acetaldehyde gas decomposition of sample after UV exposure).

Good (expressed by ○): difference≤30%
Fair (expressed by Δ): 30%<difference≤50%
Poor (expressed by x): difference>50%

Example 1

<Preparation of Dispersion of Titanium Oxide Fine Particles Containing Copper Component: CuA-1>

To a 36 wt % titanium(IV) chloride aqueous solution, copper(II) chloride was added so as to provide a Ti/Cu molar ratio of 20. The solution was diluted 10 times with pure water. To the aqueous solution, 10 wt % aqueous ammonia was gradually added so that neutralization and hydrolysis might take place, yielding a precipitate of titanium hydroxide containing copper. At this point, the solution was at pH 8. The resulting titanium hydroxide precipitate was deionized by repeating pure water addition and decantation. To the copper-containing titanium hydroxide precipitate as deionization treated, 30 wt % aqueous hydrogen peroxide was added so as to provide a hydrogen peroxide/titanium hydroxide molar ratio of at least 6.0. Subsequent stirring at room temperature for 24 hours allowed for thorough reaction. Thereafter, pure water was added for concentration adjustment, yielding a yellowish green clear solution (a) of copper-containing peroxotitanic acid (solids concentration 1 wt %).

A 500-mL volume autoclave was charged with 400 mL of peroxotitanic acid solution (a), which was subjected to hydrothermal treatment under conditions: 130° C. and 0.3 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (CuA-1).

For the titanium oxide fine particle dispersion (CuA-1) thus obtained, the average particle size of titanium oxide fine particles, the stability of titanium oxide fine particle dispersion, the presence of peroxotitanium component in titanium oxide fine particles, and the concentration of peroxotitanium component in titanium oxide fine particle dispersion were determined. Also, the titanium oxide fine particle dispersion was heat dried at 100° C. until a dry powder of titanium oxide was obtained. The powder samples as dried, after the UV exposure, and after the heat exposure were analyzed for XAFS spectrum.

Example 2

<Preparation of Dispersion of Titanium Oxide Fine Particles Containing Copper Component: CuA-2>

To a 36 wt % titanium(IV) chloride aqueous solution, copper(II) chloride was added so as to provide a Ti/Cu molar ratio of 1. The solution was diluted 10 times with pure water. To the aqueous solution, 10 wt % aqueous ammonia was gradually added so that neutralization and hydrolysis might take place, yielding a precipitate of titanium hydroxide containing copper. At this point, the solution was at pH 8. The resulting titanium hydroxide precipitate was deionized by repeating pure water addition and decantation. To the copper-containing titanium hydroxide precipitate as deionization treated, 30 wt % aqueous hydrogen peroxide was added so as to provide a hydrogen peroxide/titanium hydroxide molar ratio of at least 6.0. Subsequent stirring at room temperature for 24 hours allowed for thorough reaction. Thereafter, pure water was added for concentration adjustment, yielding a yellowish green clear solution (b) of copper-containing peroxotitanic acid (solids concentration 1 wt %).

A 500-mL volume autoclave was charged with 400 mL of peroxotitanic acid solution (b), which was subjected to hydrothermal treatment under conditions: 130° C. and 0.3 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (CuA-2).

For the titanium oxide fine particle dispersion (CuA-2) thus obtained, the average particle size of titanium oxide fine particles, the stability of titanium oxide fine particle dispersion, the presence of peroxotitanium component in titanium oxide fine particles, and the concentration of peroxotitanium component in titanium oxide fine particle dispersion were determined. Also, the titanium oxide fine particle dispersion was heat dried at 100° C. until a dry powder of titanium oxide was obtained. The powder samples as dried, after the UV exposure, and after the heat exposure were analyzed for XAFS spectrum.

Example 3

<Preparation of Dispersion of Titanium Oxide Fine Particles Containing Copper Component: CuA-3>

To a 36 wt % titanium(IV) chloride aqueous solution, copper(II) chloride was added so as to provide a Ti/Cu molar ratio of 1,000. The solution was diluted 10 times with pure water. To the aqueous solution, 10 wt % aqueous ammonia was gradually added so that neutralization and hydrolysis might take place, yielding a precipitate of titanium hydroxide containing copper. At this point, the solution was at pH 8. The resulting titanium hydroxide precipitate was deionized by repeating pure water addition and decantation. To the copper-containing titanium hydroxide precipitate as deionization treated, 30 wt % aqueous hydrogen peroxide was added so as to provide a hydrogen peroxide/titanium hydroxide molar ratio of at least 6.0. Subsequent stirring at room temperature for 24 hours allowed for thorough reaction. Thereafter, pure water was added for concentration adjustment, yielding a yellowish green clear solution (c) of copper-containing peroxotitanic acid (solids concentration 1 wt %).

A 500-mL volume autoclave was charged with 400 mL of peroxotitanic acid solution (c), which was subjected to hydrothermal treatment under conditions: 130° C. and 0.3 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (CuA-3).

For the titanium oxide fine particle dispersion (CuA-3) thus obtained, the average particle size of titanium oxide fine particles, the stability of titanium oxide fine particle dispersion, the presence of peroxotitanium component in titanium oxide fine particles, and the concentration of peroxotitanium component in titanium oxide fine particle dispersion were determined. Also, the titanium oxide fine particle dispersion was heat dried at 100° C. until a dry powder of titanium oxide was obtained. The powder samples as dried, after the UV exposure, and after the heat exposure were analyzed for XAFS spectrum.

Table 3 tabulates the measurement results of Examples 1 to 3.

addition and decantation. To the vanadium/tin-containing titanium hydroxide precipitate as deionization treated, 30 wt % aqueous hydrogen peroxide was added so as to provide a hydrogen peroxide/titanium hydroxide molar ratio of at least 2.5. Subsequent stirring at room temperature for 24 hours allowed for thorough reaction. Thereafter, pure water was added for concentration adjustment, yielding a yellow clear solution (a') of vanadium/tin-containing peroxotitanic acid (solids concentration 1 wt %).

A 500-mL volume autoclave was charged with 400 mL of peroxotitanic acid solution (a'), which was subjected to hydrothermal treatment under conditions: 150° C. and 0.5 MPa for 90 minutes. Thereafter, the reaction mixture in the autoclave was transferred through a sampling tube to a container kept in a water bath at 25° C. The reaction was quenched by this quick cooling, obtaining a titanium oxide fine particle dispersion (A).

The titanium oxide fine particle dispersion (A) was dried at room temperature until a powder was obtained. The powder was analyzed by an infrared spectrophotometer, observing a peak of O—O bond in peroxo group near 900 $cm^{-1}$.

Sulfuric acid was added to titanium oxide fine particle dispersion (A) whereby the peroxotitanium component was colored orange. Absorption of this color was measured by a UV/Vis/IR spectrophotometer, and the concentration of peroxotitanium component was determined to be 0.31%, using the calibration curve previously obtained from Ti standard solution.

TABLE 1

| | Designation of titanium oxide dispersion | Average particle size of titanium oxide, nm | Stability of titanium oxide dispersion | Peroxotitanium component | | Ti/Cu molar ratio | Accelerated degradation | XANES | Evaluation of EXAFS radial structure function | | Judgment |
| | | | | Presence of O—O bond | Concentration in dispersion, % | | | | Peak position of second coordination sphere, Å | Difference from blank, % | |
|---|---|---|---|---|---|---|---|---|---|---|---|
| Example 1 | CuA-1 | 9.7 | ○ | ○ | 0.5 | 20 | nil (blank) | — | 2.607 | — | ○ |
| | | | | | | | UV exposure | ○ | 2.573 | 1.304 | |
| | | | | | | | 500° C. heating | ○ | 2.602 | 0.192 | |
| Example 2 | CuA-2 | 9.9 | ○ | ○ | 0.6 | 1 | nil (blank) | — | 2.633 | — | ○ |
| | | | | | | | UV exposure | ○ | 2.598 | 1.329 | |
| | | | | | | | 500° C. heating | ○ | 2.556 | 2.924 | |
| Example 3 | CuA-3 | 10.2 | ○ | ○ | 0.5 | 1,000 | nil (blank) | — | 2.621 | — | ○ |
| | | | | | | | UV exposure | ○ | 2.583 | 1.450 | |
| | | | | | | | 500° C. heating | ○ | 2.557 | 2.442 | |

It is evident that the copper-containing titanium oxide fine particles prepared by the methods of Examples 1 to 3 showed no substantial change of Cu coordination and remained stable against UV exposure and 500° C. heating environment.

Example 4

<Preparation of Dispersion of Titanium Oxide Fine Particles Containing Vanadium and Tin Components>

To a 36 wt % titanium(IV) chloride aqueous solution, vanadyl(IV) sulfate was added so as to provide a Ti/V molar ratio of 2,000 and tin(IV) chloride was added so as to provide a Ti/Sn molar ratio of 20. The solution was diluted 10 times with pure water. To the aqueous solution, 10 wt % aqueous ammonia was gradually added so that neutralization and hydrolysis might take place, yielding a precipitate of titanium hydroxide containing vanadium and tin. At this point, the solution was at pH 8. The resulting titanium hydroxide precipitate was deionized by repeating pure water <Preparation of Dispersion of Titanium Oxide Fine Particles Containing Copper Component>

To a 36 wt % titanium(IV) chloride aqueous solution, copper(II) chloride was added so as to provide a Ti/Cu molar ratio of 20. The solution was diluted 10 times with pure water. To the aqueous solution, 10 wt % aqueous ammonia was gradually added so that neutralization and hydrolysis might take place, yielding a precipitate of titanium hydroxide containing copper. At this point, the solution was at pH 8. The resulting titanium hydroxide precipitate was deionized by repeating pure water addition and decantation. To the copper-containing titanium hydroxide precipitate as deionization treated, 30 wt % aqueous hydrogen peroxide was added so as to provide a hydrogen peroxide/titanium hydroxide molar ratio of at least 6.0. Subsequent stirring at room temperature for 24 hours allowed for thorough reaction. Thereafter, pure water was added for concentration adjustment, yielding a yellowish green clear solution (b') of copper-containing peroxotitanic acid (solids concentration 1 wt %).

A 500-mL volume autoclave was charged with 400 mL of peroxotitanic acid solution (b'), which was subjected to hydrothermal treatment under conditions: 130° C. and 0.3 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (B).

The titanium oxide fine particle dispersion (B) was dried at room temperature until a powder was obtained. The powder was analyzed by an infrared spectrophotometer, observing a peak of O—O bond in peroxo group near 900 $cm^{-1}$.

Sulfuric acid was added to titanium oxide fine particle dispersion (B) whereby the peroxotitanium component was colored orange. Absorption of this color was measured by a UV/Vis/IR spectrophotometer, and the concentration of peroxotitanium component was determined to be 0.50%, using the calibration curve previously obtained from Ti standard solution.

The titanium oxide fine particle dispersion (A) and titanium oxide fine particle dispersion (B) were mixed in a weight ratio A/B of 50/50, yielding a visible-light-responsive photocatalytic fine particle dispersion (α) within the scope of the invention. The photocatalytic fine particles in the dispersion had an average particle size of 11 nm. The photocatalytic fine particle dispersion was held in an indoor cold dark place for 6 months, after which the average particle size was 12 nm (good: ○).

A test coating liquid was prepared by adding a silica-based binder (colloidal silica, trade name Snowtex 20 by Nissan Chemical Industries Ltd.) to photocatalytic fine particle dispersion (α) so as to provide a $TiO_2/SiO_2$ weight ratio of 1.5, yielding a test coating liquid.

The test coating liquid was coated onto a glass plate by a dip coater and dried to form a photocatalyst thin film of 150 nm thick, obtaining a test sample. On haze measurement by a haze meter, the difference in haze between the glass plate as substrate and the photocatalyst-coated glass plate was 0.5% (good: ○).

The test coating liquid was coated onto a A4-size PET sheet by a #7 wire bar coater so as to form a photocatalyst thin film of 50 mg, obtaining a sample for the acetaldehyde gas decomposition performance test. A percent gas decomposition of this photocatalyst thin film was measured by the batchwise gas decomposition performance test, finding a gas decomposition n value of 98% after 12 hours of LED illumination.

The sample after the acetaldehyde gas decomposition performance test was exposed to UV for 200 hours using UV-LED tailored so as to provide a UV intensity of 3 $mW/cm^2$. Then the acetaldehyde gas decomposition performance test was performed again, finding a gas decomposition value of 98% after 12 hours of LED illumination (good: ○).

Example 5

A visible-light-responsive photocatalytic fine particle dispersion (β) within the scope of the invention was obtained as in Example 4 aside from mixing the titanium oxide fine particle dispersion (A) and titanium oxide fine particle dispersion (B) in a weight ratio A/B of 30/70. The photocatalytic fine particles in the dispersion had an average particle size of 12 nm. The photocatalytic fine particle dispersion was held in an indoor cold dark place for 6 months, after which the average particle size was 14 nm (good: ○).

Thereafter, as in Example 4, a test coating liquid was prepared from the photocatalytic fine particle dispersion (β). A photocatalyst thin film was prepared from the test coating liquid and measured for the transparency and the acetaldehyde gas decomposition performance (gas decomposition value) before and after UV exposure. The haze difference was 0.6% (good: ○), and the gas decomposition values were 82% and 80% (good: ○).

Example 6

A visible-light-responsive photocatalytic fine particle dispersion (γ) within the scope of the invention was obtained as in Example 4 aside from mixing the titanium oxide fine particle dispersion (A) and titanium oxide fine particle dispersion (B) in a weight ratio A/B of 70/30. The photocatalytic fine particles in the dispersion had an average particle size of 10 nm. The photocatalytic fine particle dispersion was held in an indoor cold dark place for 6 months, after which the average particle size was 11 nm (good: ○).

Thereafter, as in Example 4, a test coating liquid was prepared from the photocatalytic fine particle dispersion (γ). A photocatalyst thin film was prepared from the test coating liquid and measured for the transparency and the acetaldehyde gas decomposition performance (gas decomposition value) before and after UV exposure. The haze difference was 0.4% (good: ○), and the gas decomposition values were 78% and 75% (good: ○).

Example 7

<Preparation of Dispersion of Titanium Oxide Fine Particles Containing Vanadium and Tin Components>

Like peroxotitanic acid solution (a') in Example 4 aside from adding vanadyl(IV) sulfate to 36 wt % titanium(IV) chloride aqueous solution so as to provide a Ti/V molar ratio of 200, a yellow clear solution (c') of vanadium/tin-containing peroxotitanic acid (solids concentration 1 wt %) was obtained.

A 500-mL volume autoclave was charged with 400 mL of peroxotitanic acid solution (c'), which was subjected to hydrothermal treatment under conditions: 180° C. and 1.1 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (C).

The titanium oxide fine particle dispersion (C) was dried at room temperature until a powder was obtained. The powder was analyzed by an infrared spectrophotometer, observing a peak of O—O bond in peroxo group near 900 $cm^{-1}$.

Sulfuric acid was added to titanium oxide fine particle dispersion (C) whereby the peroxotitanium component was colored orange. Absorption of this color was measured by a UV/Vis/IR spectrophotometer, and the concentration of peroxotitanium component was determined to be 0.12%, using the calibration curve previously obtained from Ti standard solution.

The titanium oxide fine particle dispersion (C) and titanium oxide fine particle dispersion (B) were mixed in a weight ratio C/B of 50/50, yielding a visible-light-responsive photocatalytic fine particle dispersion (δ) within the scope of the invention. The photocatalytic fine particles in the dispersion had an average particle size of 10 nm. The photocatalytic fine particle dispersion was held in an indoor cold dark place for 6 months, after which the average particle size was 10 nm (good: ○).

Thereafter, as in Example 4, a test coating liquid was prepared from the photocatalytic fine particle dispersion (8). A photocatalyst thin film was prepared from the test coating liquid and measured for the transparency and the acetaldehyde gas decomposition performance (gas decomposition value) before and after UV exposure. The haze difference was 0.4% (good: ○), and the gas decomposition values were 75% and 72% (good: ○).

Example 8

<Preparation of Dispersion of Titanium Oxide Fine Particles Containing Vanadium and Tin Components>

Like peroxotitanic acid solution (a') in Example 4 aside from adding tin(IV) chloride to 36 wt % titanium(IV) chloride aqueous solution so as to provide a Ti/Sn molar ratio of 500, a yellow clear solution (d') of vanadium/tin-containing peroxotitanic acid (solids concentration 1 wt %) was obtained.

A 500-mL volume autoclave was charged with 400 mL of peroxotitanic acid solution (d), which was subjected to hydrothermal treatment under conditions: 120° C. and 0.2 MPa for 240 minutes. Thereafter, the reaction mixture in the autoclave was transferred through a sampling tube to a container kept in a water bath at 25° C. The reaction was quenched by this quick cooling, obtaining a titanium oxide fine particle dispersion (D).

The titanium oxide fine particle dispersion (D) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (D) whereby the peroxotitanium component was colored orange. Absorption of this color was measured by a UV/Vis/IR spectrophotometer, and the concentration of peroxotitanium component was determined to be 0.35%, using the calibration curve previously obtained from Ti standard solution.

The titanium oxide fine particle dispersion (D) and titanium oxide fine particle dispersion (B) were mixed in a weight ratio D/B of 50/50, yielding a visible-light-responsive photocatalytic fine particle dispersion (E) within the scope of the invention. The photocatalytic fine particles in the dispersion had an average particle size of 15 nm. The photocatalytic fine particle dispersion was held in an indoor cold dark place for 6 months, after which the average particle size was 16 nm (good: ○).

Thereafter, as in Example 4, a test coating liquid was prepared from the photocatalytic fine particle dispersion (ε). A photocatalyst thin film was prepared from the test coating liquid and measured for the transparency and the acetaldehyde gas decomposition performance (gas decomposition value) before and after UV exposure. The haze difference was 0.6% (good: ○), and the gas decomposition values were 73% and 70% (good: ○).

Example 9

A 500-mL volume autoclave was charged with 400 mL of peroxotitanic acid solution (a'), which was subjected to hydrothermal treatment under conditions: 150° C. and 0.5 MPa for 60 minutes. Thereafter, the reaction mixture in the autoclave was transferred through a sampling tube to a container kept in a water bath at 25° C. The reaction was quenched by this quick cooling, obtaining a titanium oxide fine particle dispersion (E).

The titanium oxide fine particle dispersion (E) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (E) whereby the peroxotitanium component was colored orange. Absorption of this color was measured by a UV/Vis/IR spectrophotometer, and the concentration of peroxotitanium component was determined to be 1.50%, using the calibration curve previously obtained from Ti standard solution.

The titanium oxide fine particle dispersion (E) and titanium oxide fine particle dispersion (B) were mixed in a weight ratio E/B of 50/50, yielding a visible-light-responsive photocatalytic fine particle dispersion (ζ) within the scope of the invention. The photocatalytic fine particles in the dispersion had an average particle size of 9 nm. The photocatalytic fine particle dispersion was held in an indoor cold dark place for 6 months, after which the average particle size was 9 nm (good: ○).

Thereafter, as in Example 4, a test coating liquid was prepared from the photocatalytic fine particle dispersion (ζ) A photocatalyst thin film was prepared from the test coating liquid and measured for the transparency and the acetaldehyde gas decomposition performance (gas decomposition value) before and after UV exposure. The haze difference was 0.3% (good: ○), and the gas decomposition values were 75% and 72% (good: ○).

Example 10

<Preparation of Dispersion of Titanium Oxide Fine Particles Containing Copper Component>

Like peroxotitanic acid solution (b') in Example 1 aside from adding copper(II) chloride to 36 wt % titanium(IV) chloride aqueous solution so as to provide a Ti/Cu molar ratio of 200, a yellowish green clear solution (f') of copper-containing peroxotitanic acid (solids concentration 1 wt %) was obtained.

A 500-mL volume autoclave was charged with 400 mL of peroxotitanic acid solution (f'), which was subjected to hydrothermal treatment under conditions: 130° C. and 0.3 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (F).

The titanium oxide fine particle dispersion (F) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (F) whereby the peroxotitanium component was colored orange. Absorption of this color was measured by a UV/Vis/IR spectrophotometer, and the concentration of peroxotitanium component was determined to be 0.24%, using the calibration curve previously obtained from Ti standard solution.

The titanium oxide fine particle dispersion (F) was determined for the Cu coordination state and other properties before and after UV exposure and heat exposure, with the results shown in Table 2.

TABLE 2

| Designation of titanium oxide dispersion | Average particle size of titanium oxide, nm | Stability of titanium oxide dispersion | Peroxotitanium component | | Ti/Cu molar ratio | Accelerated degradation | XANES | Evaluation of EXAFS radial structure function | | Judgment |
|---|---|---|---|---|---|---|---|---|---|---|
| | | | Presence of O—O bond | Concentration in dispersion, % | | | | Peak position of second coordination sphere, Å | Difference from blank, % | |
| (F) | 22.5 | ○ | ○ | 0.24 | 200 | nil (blank) | — | 2.627 | — | ○ |
| | | | | | | UV exposure | ○ | 2.591 | 1.370 | |
| | | | | | | 500° C. heating | ○ | 2.557 | 2.665 | |

The titanium oxide fine particle dispersion (A) and titanium oxide fine particle dispersion (F) were mixed in a weight ratio A/F of 50/50, yielding a visible-light-responsive photocatalytic fine particle dispersion (η) within the scope of the invention. The photocatalytic fine particles in the dispersion had an average particle size of 20 nm. The photocatalytic fine particle dispersion was held in an indoor cold dark place for 6 months, after which the average particle size was 22 nm (good: ○).

Thereafter, as in Example 4, a test coating liquid was prepared from the photocatalytic fine particle dispersion (η). A photocatalyst thin film was prepared from the test coating liquid and measured for the transparency and the acetaldehyde gas decomposition performance (gas decomposition value) before and after UV exposure. The haze difference was 0.9% (good: ○), and the gas decomposition values were 72% and 51% (good: ○).

Example 11

<Preparation of Dispersion of Titanium Oxide Fine Particles Containing Iron and Tin Components>

To a 36 wt % titanium(IV) chloride aqueous solution, iron(III) chloride was added so as to provide a Ti/Fe molar ratio of 2,000 and tin(IV) chloride was added so as to provide a Ti/Sn molar ratio of 20. The solution was diluted 10 times with pure water. To the aqueous solution, 10 wt % aqueous ammonia was gradually added so that neutralization and hydrolysis might take place, yielding a precipitate of titanium hydroxide containing iron and tin. At this point, the solution was at pH 8. The resulting titanium hydroxide precipitate was deionized by repeating pure water addition and decantation. To the iron/tin-containing titanium hydroxide precipitate as deionization treated, 30 wt % aqueous hydrogen peroxide was added so as to provide a hydrogen peroxide/titanium hydroxide molar ratio of at least 2.5. Subsequent stirring at room temperature for 24 hours allowed for thorough reaction. Thereafter, pure water was added for concentration adjustment, yielding a yellow clear solution (g) of iron/tin-containing peroxotitanic acid (solids concentration 1 wt %).

A 500-mL volume autoclave was charged with 400 mL of peroxotitanic acid solution (g), which was subjected to hydrothermal treatment under conditions: 150° C. and 0.5 MPa for 90 minutes. Thereafter, the reaction mixture in the autoclave was transferred through a sampling tube to a container kept in a water bath at 25° C. The reaction was quenched by this quick cooling, obtaining a titanium oxide fine particle dispersion (G).

The titanium oxide fine particle dispersion (G) was dried at room temperature until a powder was obtained. The powder was analyzed by an infrared spectrophotometer, observing a peak of O—O bond in peroxo group near 900 $cm^{-1}$.

Sulfuric acid was added to titanium oxide fine particle dispersion (G) whereby the peroxotitanium component was colored orange. Absorption of this color was measured by a UV/Vis/IR spectrophotometer, and the concentration of peroxotitanium component was determined to be 0.30%, using the calibration curve previously obtained from Ti standard solution.

The titanium oxide fine particle dispersion (G) and titanium oxide fine particle dispersion (B) were mixed in a weight ratio G/B of 50/50, yielding a visible-light-responsive photocatalytic fine particle dispersion (θ) within the scope of the invention. The photocatalytic fine particles in the dispersion had an average particle size of 10 nm. The photocatalytic fine particle dispersion was held in an indoor cold dark place for 6 months, after which the average particle size was 11 nm (good: ○).

Thereafter, as in Example 4, a test coating liquid was prepared from the photocatalytic fine particle dispersion (θ). A photocatalyst thin film was prepared from the test coating liquid and measured for the transparency and the acetaldehyde gas decomposition performance (gas decomposition value) before and after UV exposure. The haze difference was 0.5% (good: ○), and the gas decomposition values were 76% and 62% (good: ○).

Example 12

<Preparation of Dispersion of Titanium Oxide Fine Particles Containing Molybdenum and Tin Components>

To a 36 wt % titanium(IV) chloride aqueous solution, molybdenum(V) chloride was added so as to provide a Ti/Mo molar ratio of 20 and tin(IV) chloride was added so as to provide a Ti/Sn molar ratio of 20. The solution was diluted 10 times with pure water. To the aqueous solution, 10 wt % aqueous ammonia was gradually added so that neutralization and hydrolysis might take place, yielding a precipitate of titanium hydroxide containing molybdenum and tin. At this point, the solution was at pH 8. The resulting titanium hydroxide precipitate was deionized by repeating pure water addition and decantation. To the molybdenum/tin-containing titanium hydroxide precipitate as deionization treated, 30 wt % aqueous hydrogen peroxide was added so as to provide a hydrogen peroxide/titanium hydroxide molar ratio of at least 2.5. Subsequent stirring at room temperature for 24 hours allowed for thorough reaction. Thereafter, pure water was added for concentration adjustment, yielding a yellow clear solution (h) of molybdenum/tin-containing peroxotitanic acid (solids concentration 1 wt %).

A 500-mL volume autoclave was charged with 400 mL of peroxotitanic acid solution (h), which was subjected to hydrothermal treatment under conditions: 150° C. and 0.5 MPa for 90 minutes. Thereafter, the reaction mixture in the autoclave was transferred through a sampling tube to a container kept in a water bath at 25° C. The reaction was quenched by this quick cooling, obtaining a titanium oxide fine particle dispersion (H).

The titanium oxide fine particle dispersion (H) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (H) whereby the peroxotitanium component was colored orange. Absorption of this color was measured by a UV/Vis/IR spectrophotometer, and the concentration of peroxotitanium component was determined to be 0.33%, using the calibration curve previously obtained from Ti standard solution.

The titanium oxide fine particle dispersion (H) and titanium oxide fine particle dispersion (B) were mixed in a weight ratio H/B of 50/50, yielding a visible-light-responsive photocatalytic fine particle dispersion (ι) within the scope of the invention. The photocatalytic fine particles in the dispersion had an average particle size of 9 nm. The photocatalytic fine particle dispersion was held in an indoor cold dark place for 6 months, after which the average particle size was 10 nm (good: ○).

Thereafter, as in Example 4, a test coating liquid was prepared from the photocatalytic fine particle dispersion (ι). A photocatalyst thin film was prepared from the test coating liquid and measured for the transparency and the acetaldehyde gas decomposition performance (gas decomposition value) before and after UV exposure. The haze difference was 0.8% (good: ○) and the gas decomposition values were 98% and 98% (good: ○).

Comparative Example 1

A photocatalytic fine particle dispersion (κ) was obtained as in Example 4 aside from adding and mixing 1% copper sulfate aqueous solution, instead of titanium oxide fine particle dispersion (B), so as to provide a metallic copper content of 0.10% by weight based on the titanium oxide. The titanium oxide fine particles in the dispersion had an average particle size of 11 nm. The titanium oxide fine particle dispersion was held in an indoor cold dark place for 6 months, after which the average particle size was 12 nm (good: ○).

Thereafter, as in Example 4, a test coating liquid was prepared from the photocatalytic fine particle dispersion (κ). A photocatalyst thin film was prepared from the test coating liquid and measured for the transparency and the acetaldehyde gas decomposition performance (gas decomposition value) before and after UV exposure. The haze difference was 0.5% (good: ○), and the gas decomposition values were 58% and 0% (poor: x).

Comparative Example 2

<Preparation of Dispersion of Titanium Oxide Fine Particles Containing Tin Component>

Like peroxotitanic acid solution (a') in Example 4 aside from omitting vanadyl(IV) sulfate, a yellow clear solution (i') of tin-containing peroxotitanic acid (solids concentration 1 wt %) was obtained.

A 500-mL volume autoclave was charged with 400 mL of peroxotitanic acid solution (i'), which was subjected to hydrothermal treatment under conditions: 150° C. and 0.5 MPa for 90 minutes. Thereafter, the reaction mixture in the autoclave was transferred through a sampling tube to a container kept in a water bath at 25° C. The reaction was quenched by this quick cooling, obtaining a titanium oxide fine particle dispersion (I).

The titanium oxide fine particle dispersion (I) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (I) whereby the peroxotitanium component was colored orange. Absorption of this color was measured by a UV/Vis/IR spectrophotometer, and the concentration of peroxotitanium component was determined to be 0.32%, using the calibration curve previously obtained from Ti standard solution.

The titanium oxide fine particle dispersion (I) and titanium oxide fine particle dispersion (B) were mixed in a weight ratio I/B of 50/50, yielding a photocatalytic fine particle dispersion (λ). The photocatalytic fine particles in the dispersion had an average particle size of 11 nm. The photocatalytic fine particle dispersion was held in an indoor cold dark place for 6 months, after which the average particle size was 11 nm (good: ○).

Thereafter, as in Example 4, a test coating liquid was prepared from the photocatalytic fine particle dispersion (λ). A photocatalyst thin film was prepared from the test coating liquid and measured for the transparency and the acetaldehyde gas decomposition performance (gas decomposition value) before and after UV exposure. The haze difference was 0.5% (good: ○), and the gas decomposition values were 10% and 9% (good: ○).

Comparative Example 3

<Preparation of Dispersion of Titanium Oxide Fine Particles Containing Vanadium Component>

By the same procedure as in Example 4 aside from omitting the addition of tin(IV) chloride to 36 wt % titanium (IV) chloride aqueous solution, a yellow clear solution (j') of vanadium-containing peroxotitanic acid (solids concentration 1 wt %) was obtained.

A 500-mL volume autoclave was charged with 400 mL of peroxotitanic acid solution (j'), which was subjected to hydrothermal treatment under conditions: 120° C. and 0.2 MPa for 180 minutes. Thereafter, the reaction mixture in the autoclave was transferred through a sampling tube to a container kept in a water bath at 25° C. The reaction was quenched by this quick cooling, obtaining a titanium oxide fine particle dispersion (J).

The titanium oxide fine particle dispersion (J) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (J) whereby the peroxotitanium component was colored orange. Absorption of this color was measured by a UV/Vis/IR spectrophotometer, and the concentration of peroxotitanium component was determined to be 0.26%, using the calibration curve previously obtained from Ti standard solution.

The titanium oxide fine particle dispersion (J) and titanium oxide fine particle dispersion (B) were mixed in a weight ratio J/B of 50/50, yielding a photocatalytic fine particle dispersion (μ). The photocatalytic fine particles in the dispersion had an average particle size of 22 nm. The photocatalytic fine particle dispersion was held in an indoor cold dark place for 6 months, after which the average particle size was 23 nm (good: ○).

Thereafter, as in Example 4, a test coating liquid was prepared from the photocatalytic fine particle dispersion (μ). A photocatalyst thin film was prepared from the test coating liquid and measured for the transparency and the acetaldehyde gas decomposition performance (gas decomposition value) before and after UV exposure. The haze difference was 0.7% (good: ○), and the gas decomposition values were 18% and 16% (fair: Δ).

Comparative Example 4

<Preparation of Dispersion of Titanium Oxide Fine Particles Free of Copper Component>

Like peroxotitanic acid solution (b') in Example 4 aside from omitting the addition of copper component to 36 wt % titanium(IV) chloride aqueous solution, a yellow clear solution (k') of peroxotitanic acid (solids concentration 1 wt %) was obtained.

A 500-mL volume autoclave was charged with 400 mL of peroxotitanic acid solution (k'), which was subjected to hydrothermal treatment under conditions: 120° C. and 0.2 MPa for 240 minutes. Thereafter, the reaction mixture in the autoclave was transferred through a sampling tube to a container kept in a water bath at 25° C. The reaction was quenched by this quick cooling, obtaining a titanium oxide fine particle dispersion (K).

The titanium oxide fine particle dispersion (K) was dried at room temperature until a powder was obtained. The powder was analyzed by an infrared spectrophotometer, observing a peak of O—O bond in peroxo group near 900 cm$^{-1}$.

Sulfuric acid was added to titanium oxide fine particle dispersion (K) whereby the peroxotitanium component was colored orange. Absorption of this color was measured by a UV/Vis/IR spectrophotometer, and the concentration of peroxotitanium component was determined to be 0.25%, using the calibration curve previously obtained from Ti standard solution.

The titanium oxide fine particle dispersion (A) and titanium oxide fine particle dispersion (K) were mixed in a weight ratio A/K of 50/50, yielding a photocatalytic fine particle dispersion (v). The photocatalytic fine particles in the dispersion had an average particle size of 16 nm. The photocatalytic fine particle dispersion was held in an indoor cold dark place for 6 months, after which the average particle size was 16 nm (good: ○).

Thereafter, as in Example 4, a test coating liquid was prepared from the photocatalytic fine particle dispersion (v). A photocatalyst thin film was prepared from the test coating liquid and measured for the transparency and the acetaldehyde gas decomposition performance (gas decomposition value) before and after UV exposure. The haze difference was 0.6% (good: ○), and the gas decomposition values were 0% and 0% (UV resistance evaluation impossible).

Table 3 tabulates the element ratios in titanium oxide fine particles, hydrothermal treatment conditions, peroxotitanium component in normal temperature dry powder, and the concentration of peroxotitanium component in the dispersion in Examples 4 to 12 and Comparative Examples 1 to 4.

Table 4 tabulates the average particle size, dispersion stability, thin film transparency, and acetaldehyde gas decomposition value after 12 hours of LED illumination in the acetaldehyde gas decomposition test before and after UV exposure, of visible-light-responsive photocatalytic fine particle dispersions in Examples 4 to 12 and Comparative Examples 1 to 4.

As seen from the results of Comparative Example 1, when the copper component described in the previous proposal (JP-A 2013-126654) is used, a substantial decline of visible light activity occurs under exposure to UV.

As seen from the results of Comparative Example 2, no satisfactory visible light activity is available when vanadium is omitted.

As seen from the results of Comparative Example 3, no satisfactory visible light activity is available when tin is omitted.

As seen from the results of Comparative Example 4, no satisfactory visible light activity is available when copper is omitted.

It is seen from the results of Examples 4 to 12 that when the dispersion of (i) titanium oxide fine particles containing predetermined amounts of a peroxotitanium component, a tin component and a transition metal component selected from vanadium, iron, molybdenum and the like and the dispersion of (ii) titanium oxide fine particles containing predetermined amounts of a peroxotitanium component and a copper component are mixed in predetermined amounts, the resulting dispersion is improved in the decomposition of acetaldehyde gas even under LED illumination emitting only light of the visible region, i.e., improved in photocatalytic activity, and maintains the activity even under a potential UV exposure environment.

TABLE 3

| Titanium oxide dispersion | Element ratio | | | | | Hydrothermal treatment | | Peroxotitanium component | |
|---|---|---|---|---|---|---|---|---|---|
| | Ti/Sn | Ti/V | Ti/Fe | Ti/Mo | Ti/Cu | Temp. (° C.) | Time (min) | Presence of O—O bond | Concentration in dispersion, % |
| (A) | 20 | 2,000 | — | — | — | 150 | 90 | ○ | 0.31 |
| (B) | — | — | — | — | 20 | 130 | 180 | ○ | 0.50 |
| (C) | 20 | 200 | — | — | — | 180 | 180 | ○ | 0.12 |
| (D) | 500 | 2,000 | — | — | — | 120 | 240 | ○ | 0.35 |
| (E) | 20 | 2,000 | — | — | — | 150 | 60 | ○ | 1.50 |
| (F) | — | — | — | — | 200 | 130 | 180 | ○ | 0.24 |
| (G) | 20 | — | 2,000 | — | — | 150 | 90 | ○ | 0.30 |
| (H) | 20 | — | — | 20 | — | 150 | 90 | ○ | 0.33 |

TABLE 3-continued

| Titanium oxide dispersion | Element ratio | | | | | Hydrothermal treatment | | Peroxotitanium component | |
|---|---|---|---|---|---|---|---|---|---|
| | Ti/Sn | Ti/V | Ti/Fe | Ti/Mo | Ti/Cu | Temp. (°C.) | Time (min) | Presence of O—O bond | Concentration in dispersion, % |
| (I) | 20 | 0 | — | — | — | 150 | 90 | ○ | 0.32 |
| (J) | 0 | 2,000 | — | — | — | 120 | 180 | ○ | 0.26 |
| (K) | — | — | — | — | — | 120 | 240 | ○ | 0.25 |

TABLE 4

| | Photocatalytic dispersion | Titanium oxide fine particle dispersion Type | Mixing ratio | Evaluation results | | | Gas degradation value | | UV resistance |
|---|---|---|---|---|---|---|---|---|---|
| | | | | Average particle size (nm) | Dispersion stability | Thin film transparency | Before UV exposure, % | After UV exposure, % | |
| Example 4 | α | (A) (B) | 50:50 | 11 | ○ | ○ | 98 | 98 | ○ |
| Example 5 | β | (A) (B) | 30:70 | 12 | ○ | ○ | 82 | 80 | ○ |
| Example 6 | γ | (A) (B) | 70:30 | 10 | ○ | ○ | 78 | 75 | ○ |
| Example 7 | δ | (C) (B) | 50:50 | 10 | ○ | ○ | 75 | 72 | ○ |
| Example 8 | ε | (D) (B) | 50:50 | 15 | ○ | ○ | 73 | 70 | ○ |
| Example 9 | ζ | (E) (B) | 50:50 | 9 | ○ | ○ | 75 | 72 | ○ |
| Example 10 | η | (A) (F) | 50:50 | 20 | ○ | ○ | 72 | 51 | ○ |
| Example 11 | θ | (G) (B) | 50:50 | 10 | ○ | ○ | 76 | 62 | ○ |
| Example 12 | ι | (H) (B) | 50:50 | 9 | ○ | ○ | 98 | 98 | ○ |
| Comparative Example 1 | κ | (A) — | — | 11 | ○ | ○ | 58 | 0 | X |
| Comparative Example 2 | λ | (I) (B) | 50:50 | 11 | ○ | ○ | 10 | 9 | ○ |
| Comparative Example 3 | μ | (J) (B) | 50:50 | 22 | ○ | ○ | 18 | 16 | Δ |
| Comparative Example 4 | ν | (A) (K) | 50:50 | 16 | ○ | ○ | 0 | 0 | — |

INDUSTRIAL APPLICABILITY

The visible-light-responsive photocatalytic fine particle dispersion of the invention is useful in forming photocatalyst thin films by applying it to various substrates of inorganic materials such as glass and metals and organic materials such as polymer sheets, typically PET sheets, and especially useful in forming transparent photocatalyst thin films on polymer sheets.

The invention claimed is:

1. A visible-light-responsive photocatalytic fine particle dispersion comprising two types of titanium oxide fine particles dispersed in an aqueous dispersing medium, the two types being (i) titanium oxide fine particles containing a peroxotitanium component, a tin component, and a transition metal component for enhancing visible light response, and (ii) titanium oxide fine particles containing a peroxotitanium component and a copper component,
   wherein in the titanium oxide fine particles (i), the transition metal of the transition metal component for enhancing visible light response is selected from among vanadium, molybdenum, and chromium.

2. The visible-light-responsive photocatalytic fine particle dispersion of claim 1 wherein the titanium oxide fine particles (i) and (ii) each have a size as dispersed of 5 to 30 nm in a 50% volume cumulative distribution diameter ($D_{50}$) measured by the dynamic scattering method using laser light.

3. The visible-light-responsive photocatalytic fine particle dispersion of claim 1 wherein the peroxotitanium component is present in an amount of 0.05 to 2% by weight based on the total weight of titanium oxide fine particles (i) and (ii).

4. The visible-light-responsive photocatalytic fine particle dispersion of claim 1 wherein in titanium oxide fine particles (i), the tin component is present in such an amount relative to the titanium oxide as to give a molar ratio (Ti/Sn) in a range from 10 to 1,000 and the transition metal component (transition metal M) is present in such an amount relative to the titanium oxide as to give a molar ratio (Ti/M) in a range from 10 to 10,000.

5. The visible-light-responsive photocatalytic fine particle dispersion of claim 1 wherein in titanium oxide fine particles (ii), the copper component is present in such an amount relative to the titanium oxide as to give a molar ratio (Ti/Cu) in a range from 1 to 1,000.

6. The visible-light-responsive photocatalytic fine particle dispersion of claim 1 wherein in titanium oxide fine particles (ii), the copper component forms a solid solution.

7. The visible-light-responsive photocatalytic fine particle dispersion of claim 1 wherein the titanium oxide fine particles containing a peroxotitanium component and a copper component, before and after degradation treatment performed thereon by irradiating UV at 3 mW/cm² and a peak wavelength 365 nm for 200 hours or by heating at 500° C. for 2 hours, on measurement of Cu K-edge XAFS (x-ray absorption fine structure) spectrum near energy 9,000 eV, simultaneously satisfy the following two requirements that:

1) with respect to the maximum peak of absorption spectrum observed in the range of 8,970 to 9,000 eV in the XANES (x-ray absorption near edge structure) spectrum, a relative absorption amount does not undergo a change of at least 0.1 and an absorption energy value does not undergo a change of at least 5%, and 2) in the radial structure function obtained by fast Fourier transform of the $k^3\chi(k)$ Cu K-edge EXAFS (extended x-ray absorption fine structure) spectrum, obtained as the same measurement result, the maximum peak position within the range of 2 to 3 Å judged to fall in the first to second coordination spheres of Cu does not undergo a change of at least 5%.

8. The visible-light-responsive photocatalytic fine particle dispersion of claim 1, further comprising a binder.

9. The visible-light-responsive photocatalytic fine particle dispersion of claim 8 wherein the binder is a silicon compound-based binder.

10. A member having on its surface a photocatalyst thin film which is formed by using the visible-light-responsive photocatalytic fine particle dispersion of claim 1.

11. A method for manufacturing a visible-light-responsive photocatalytic fine particle dispersion, comprising the steps of:

(1) providing a starting titanium compound, a copper compound, a basic substance, hydrogen peroxide, and an aqueous dispersing medium to form a precursor aqueous solution containing the copper compound, (2) heating the precursor aqueous solution containing the copper compound obtained from step (1) at 80 to 250° C. under high pressure to form a copper-containing titanium oxide fine particle dispersion, (3) providing a starting titanium compound, a transition metal compound, a tin compound, a basic substance, hydrogen peroxide, and an aqueous dispersing medium to form a precursor aqueous solution containing the transition metal and tin compounds, (4) heating the precursor aqueous solution containing the transition metal and tin compounds obtained from step (3) at 80 to 250° C. under high pressure to form a transition metal and tin-containing titanium oxide fine particle dispersion, and (5) mixing the two types of titanium oxide fine particle dispersions obtained from steps (2) and (4) together, wherein the transition metal of the transition metal compound is selected from among vanadium, molybdenum, and chromium.

12. The visible-light-responsive photocatalytic fine particle dispersion of claim 1 wherein the fine particles (i) and (ii) are mixed such that the weight ratio of fine particles (ii) [$TiO_2$:Sn, M]/fine particles (i) [$TiO_2$:Cu] ranges from 9 to 0.1.

13. The visible-light-responsive photocatalytic fine particle dispersion of claim 1 wherein the fine particles (i) and (ii) are mixed such that the weight ratio of fine particles (ii) [$TiO_2$:Sn, M]/fine particles (i) [$TiO_2$:Cu] ranges from 4 to 0.25.

* * * * *